United States Patent
Birker et al.

(10) Patent No.: US 12,539,294 B2
(45) Date of Patent: Feb. 3, 2026

(54) COMBINATION OF AN AZETIDINE LPA1 RECEPTOR ANTAGONIST WITH PIRFENIDONE AND/OR NINTEDANIB FOR USE IN THE TREATMENT OF FIBROTIC DISEASES

(71) Applicant: Idorsia Pharmaceuticals Ltd, Allschwil (CH)

(72) Inventors: Magdalena Birker, Allschwil (CH); Cyrille Lescop, Allschwil (CH)

(73) Assignee: Idorsia Pharmaceuticals Ltd, Allschwil (CH)

( * ) Notice: Subject to any disclaimer, the term of this patent is extended or adjusted under 35 U.S.C. 154(b) by 813 days.

(21) Appl. No.: 17/782,530

(22) PCT Filed: Dec. 3, 2020

(86) PCT No.: PCT/EP2020/084401
§ 371 (c)(1),
(2) Date: Jun. 3, 2022

(87) PCT Pub. No.: WO2021/110805
PCT Pub. Date: Jun. 10, 2021

(65) Prior Publication Data
US 2023/0000846 A1    Jan. 5, 2023

(51) Int. Cl.
*A61K 31/4427* (2006.01)
*A61K 31/44* (2006.01)
*A61K 31/496* (2006.01)

(52) U.S. Cl.
CPC .......... *A61K 31/4427* (2013.01); *A61K 31/44* (2013.01); *A61K 31/496* (2013.01)

(58) Field of Classification Search
CPC ............................ A61K 31/4427; A61K 31/44
See application file for complete search history.

(56) References Cited

U.S. PATENT DOCUMENTS

| | | | |
|---|---|---|---|
| 3,097,209 A | 7/1963 | Jannsen | |
| 6,734,184 B1 | 5/2004 | Barlaam et al. | |
| 6,762,180 B1 | 7/2004 | Roth et al. | |
| 7,119,093 B2 | 10/2006 | Roth et al. | |
| 7,566,729 B1 | 7/2009 | Bradford et al. | |
| 7,696,236 B2 | 4/2010 | Bradford | |
| 7,767,225 B2 | 8/2010 | Radhakrishnan et al. | |
| 7,767,700 B2 | 8/2010 | Bradford | |
| 7,816,383 B1 | 10/2010 | Bradford et al. | |
| 7,855,290 B2 | 12/2010 | Matsushima et al. | |
| 7,910,610 B1 | 3/2011 | Bradford et al. | |
| 7,988,994 B2 | 8/2011 | Radhakrishnan et al. | |
| 7,989,474 B2 | 8/2011 | Roth et al. | |
| 8,013,002 B2 | 9/2011 | Bradford et al. | |
| 8,084,475 B2 | 12/2011 | Bradford et al. | |
| 8,318,780 B2 | 11/2012 | Bradford et al. | |
| 8,383,150 B2 | 2/2013 | Radhakrishnan et al. | |
| 8,420,674 B2 | 4/2013 | Bradford | |
| 8,592,462 B2 | 11/2013 | Bradford et al. | |
| 8,609,701 B2 | 12/2013 | Bradford et al. | |
| 8,648,098 B2 | 2/2014 | Bradford et al. | |
| 8,753,679 B2 | 6/2014 | Radhakrishnan et al. | |
| 8,754,109 B2 | 6/2014 | Bradford et al. | |
| 8,778,947 B2 | 7/2014 | Bradford | |
| 9,907,756 B2 | 3/2018 | Messerschmid et al. | |
| 10,105,323 B2 | 10/2018 | Messerschmid et al. | |
| 10,154,990 B2 | 12/2018 | Park et al. | |

(Continued)

FOREIGN PATENT DOCUMENTS

| | | |
|---|---|---|
| EP | 1 364 659 A1 | 11/2003 |
| EP | 2 481 725 A1 | 8/2012 |

(Continued)

OTHER PUBLICATIONS

Cerri et al. Real-life comparison of pirfenidone and nintedanib in patients with idiopathic pulmonary fibrosis: A 24-month assessment, Nov. 2019, pp. 1-6. (Year: 2019).*
U.S. Appl. No. 16/972,878, filed Dec. 7, 2020 (371(c) Date), Bolli et al.
U.S. Appl. No. 17/620,520, filed Dec. 17, 2021 (371(c) Date), Bolli et al.
Abu El-Asrar, A. et al., "Expression of Autotaxin and Acylglycerol Kinase in Proliferative Vitreoretinal Epiretinal Membranes," Acta Ophthalmologica, 2012, 90, e84-e89.
Alsafadi, H. et al., "An ex vivo Model to Induce Early Fibrosis-like Changes in Human Precision-cut Lung Slices," American Journal of Physiology—Lung Cellular and Molecular Physiology, 2017, 312, L896-L902.

(Continued)

*Primary Examiner* — Sarah Pihonak
*Assistant Examiner* — Mikhail O'Donnel Robinson
(74) *Attorney, Agent, or Firm* — Hoxie & Associates LLC

(57) ABSTRACT

The present invention concerns the compounds of formula (I)

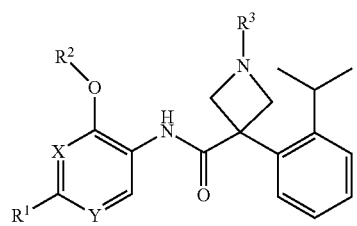

Formula (I)

wherein $R^1$, $R^2$, $R^3$, X, and Y are as described in the description, and their use as antagonists of the $LPA_1$ receptor, in combination with one or more therapeutically active ingredients acting as anti-fibrotic agent(s); such as especially pirfenidone and/or nintedanib, in the prevention and/or treatment of fibrotic diseases. The invention further relates to pharmaceutical compositions comprising the compounds of formula (I) in combination with one or more therapeutically active ingredients acting as anti-fibrotic agent(s) such as pirfenidone or nintedanib.

27 Claims, 4 Drawing Sheets

(56) References Cited

U.S. PATENT DOCUMENTS

| | | | |
|---|---|---|---|
| 10,233,195 | B2 | 3/2019 | Ramphal et al. |
| 12,344,597 | B2 | 7/2025 | Bolli et al. |
| 2004/0067908 | A1 | 4/2004 | Nakade et al. |
| 2007/0078120 | A1 | 4/2007 | Ban et al. |
| 2008/0207573 | A1 | 8/2008 | Yager et al. |
| 2008/0319188 | A1 | 12/2008 | Matsushima et al. |
| 2012/0232026 | A1 | 9/2012 | Curtis et al. |
| 2021/0246116 | A1 | 8/2021 | Bolli et al. |
| 2022/0251068 | A1* | 8/2022 | Bolli ................. A61P 35/00 |

FOREIGN PATENT DOCUMENTS

| | | | |
|---|---|---|---|
| JP | 2008-110971 A1 | 5/2008 | |
| WO | WO 96/11940 A1 | 4/1996 | |
| WO | WO 00/12478 A1 | 3/2000 | |
| WO | WO 01/32173 A1 | 5/2001 | |
| WO | WO 01/77077 A1 | 10/2001 | |
| WO | WO 02/062389 A1 | 8/2002 | |
| WO | WO 03/088908 A2 | 10/2003 | |
| WO | WO 2004/085385 A2 | 10/2004 | |
| WO | WO 2004/110350 A2 | 12/2004 | |
| WO | WO 2005/023761 A2 | 3/2005 | |
| WO | WO 2005/037269 A1 | 4/2005 | |
| WO | WO 2005/049605 A1 | 6/2005 | |
| WO | WO 2006/073967 A1 | 7/2006 | |
| WO | WO 2006/091862 A2 | 8/2006 | |
| WO | WO 2007/058990 A2 | 5/2007 | |
| WO | WO 2007/146712 A2 | 12/2007 | |
| WO | WO 2008/115281 A2 | 9/2008 | |
| WO | WO 2009/051715 A1 | 4/2009 | |
| WO | WO 2009/131940 A1 | 10/2009 | |
| WO | WO 2009/135590 A1 | 11/2009 | |
| WO | WO 2010/023181 A1 | 3/2010 | |
| WO | WO 2010/141761 A2 | 12/2010 | |
| WO | WO 2011/037192 A1 | 3/2011 | |
| WO | WO 2012/017359 A1 | 2/2012 | |
| WO | WO 2012/055995 A1 | 5/2012 | |
| WO | WO 2012/078805 A1 | 6/2012 | |
| WO | WO 2012/082817 A1 | 6/2012 | |
| WO | WO 2012/120399 A1 | 9/2012 | |
| WO | WO 2012/162592 A1 | 11/2012 | |
| WO | WO-2013025733 A1* | 2/2013 | ................. A61P 9/10 |
| WO | WO 2013/096771 A1 | 6/2013 | |
| WO | WO 2014/055548 A1 | 4/2014 | |
| WO | WO 2014/079805 A1 | 5/2014 | |
| WO | WO 2015/153683 A1 | 10/2015 | |
| WO | WO 2017/177004 A1 | 10/2017 | |
| WO | WO 2017/207643 A1 | 12/2017 | |
| WO | WO 2019/152863 A1 | 8/2019 | |
| WO | WO-2019234115 A1* | 12/2019 | ......... A61K 31/4427 |
| WO | WO 2020/254408 A1 | 12/2020 | |

OTHER PUBLICATIONS

An, S. et al., "Molecular Cloning of the Human Edg2 Protein and Its Identification as a Functional Cellular Receptor for Lysophosphatidic Acid," Biochemical and Biophysical Research Communications, 1997, 231, 619-622.

Atanelishvili, I. et al., "Antifibrotic Efficacy of Nintedanib in a Cellular Model of Systemic Sclerosis-associated Interstitial Lung Disease," Clinical and Experimental Rheumatology, 2019, 37 (Suppl. 119), S115-S124.

Baker, D. et al., "Direct Quantitative Analysis of Lysophosphatidic Acid Molecular Species by Stable Isotope Dilution Electrospray Ionization Liquid Chromatography—Mass Spectrometry," Analytical Biochemistry, 2001, 292, 287-295.

Boucharaba, A. et al., "Platelet-Derived Lysophosphatidic Acid Supports the Progression of Osteolytic Bone Metastases in Breast Cancer," The Journal of Clinical Investigation, 2004, 114 (12), 1714-1725.

Boucharaba, A. et al., "The Type 1 Lysophosphatidic Acid Receptor is a Target for Therapy in Bone Metastases," Proceedings of the National Academy of Sciences, 2006, 103 (25), 9643-9648.

Bremner, D. et al., "The Synthesis of Thienopyridines from ortho-Halogenated Pyridine Derivatives," Synthesis, 1992, 6, 528-530.

Brindley, D., "Lipid Phosphate Phosphatases and Related Proteins: Signaling Functions in Development, Cell Division, and Cancer," Journal of Cellular Biochemistry, 2004, 92, 900-912.

Castelino, F. et al., "Amelioration of Dermal Fibrosis by Genetic Deletion or Pharmacologic Antagonism of Lysophosphatidic Acid Receptor 1 in a Mouse Model of Scleroderma," Arthritis & Rheumatism, 2011, 63 (5), 1405-1415.

Choi, J. et al., "LPA Receptors: Subtypes and Biological Actions," Annual Review of Pharmacology and Toxicology, 2010, 50, 157-186.

Choi, J. et al., "Lysophospholipids and Their Receptors in the Central Nervous System," Biochimica et Biophysica Acta, 2013, 1831, 20-32.

Chong, S. et al., "Fibrocytes and Fibroblasts—Where Are We Now," International Journal of Biochemistry and Cell Biology, 2019, 116, 105595, 4 pages, https://doi.org/10.1016/j.biocel.2019.105595.

Chun, J. et al., Eds., Lysophospholipid Receptors: Signaling and Biochemistry, 2013, John Wiley & Sons, Inc., ISBN: 978-0-470-56905-4.

Distler, J. et al., "Shared and Distinct Mechanisms of Fibrosis," Nature Reviews, Rheumatology, 2019, 15, 705-730.

Clinical Trials.gov Identifier NCT01766817, "Safety and Efficacy of a Lysophosphatidic Acid Receptor Antagonist in Idiopathic Pulmonary Fibrosis," Study Drug BMS-986020 (Cas No. 1257213-50-5), 12 pages, retrieved on May 11, 2022, from https://clinicaltrials.gov/ct2/show/NCT01766817.

Clinical Trials.gov Identifier NCT04338802, "Efficacy and Safety of Nintedanib in the Treatment of Pulmonary Fibrosis in Patients With Moderate to Severe COVID-19," 8 pages, retrieved on May 11, 2022, from https://clinicaltrials.gov/ct2/show/NCT0433802.

Clinical Trials.gov NCT04541680, "Nintedanib for the Treatment of SARS-Cov-2 Induced Pulmonary Fibrosis (NINTECOR)," 9 pages, retrieved on May 11, 2022, from https://clinicaltrials.gov/ct2/show/NCT04541680.

Clinical Trials.gov Identifier NCT04607928, "Pirfenidone Compared to Placebo in Post-COVID19 Pulmonary Fibrosis COVID-19 (Fibro-COVID)," 9 pages, retrieved on May 11, 2022, from https://clinicaltrials.gov/ct2/show/NCT04607928.

Clinical Trials.gov Identifier NCT04619680, "The Study of the Use of Nintedanib in Slowing Lung Disease in Patients With Fibrotic or Non-Fibrotic Interstitial Lung Disease Related to COVID-19 (ENDCOV-I)," 13 pages, retrieved on May 11, 2022, from https://clinicaltrials.gov/ct2/show/NCT04619680.

Dollé, V. et al., "Studies Towards 4-C-Alkylation of Pyridin-2(1H)-one Derivatives," Tetrahedron, 1997, 53 (37), 12505-12524.

D'Souza, K. et al., "Lysophosphatidic Acid Signaling in Obesity and Insulin Resistance," Nutrients, 2018, 10, 399, 20 pages, doi:10.3390/nu10040399.

Fujiwara, Y. et al., "Identification of Residues Responsible for Ligand Recognition and Regioisomeric Selectivity of Lysophosphatidic Acid Receptors Expressed in Mammalian Cells," The Journal of Biological Chemistry, 2005, 280 (41), 35038-35050.

Georas, S. et al., "Lysophosphatidic Acid is Detectable in Human Bronchoalveolar Lavage Fluids at Baseline and Increased After Segmental Allergen Challenge," Clinical and Experimental Allergy, 2006, 37 (3), 311-322.

Gill, M. et al., "Pigments of Fungi. LIX*† Synthesis of (1S,3S)- and (1R,3R)-Austrocortilutein and (1S,3S)-Austrocortirubin from Citramalic Acid," Australian Journal of Chemistry, 2000, 53, 245-256.

Goetzl, E. et al., "Lysophospholipid Growth Factors and Their G Protein-coupled Receptors in Immunity, Coronary Artery Disease, and Cancer," The Scientific World Journal, 2002, 2, 324-338.

Greene, T. et al., Eds., Protective Groups in Organic Synthesis, Wiley-Interscience, 1999.

Guo, C. et al., "Mitogenic Signaling in Androgen Sensitive and Insensitive Prostate Cancer Cell Lines," The Journal of Urology, 2000, 163, 1027-1032.

Hecht, J. et al., "Ventricular Zone Gene-1 (vzg-1) Encodes a Lysophosphatidic Acid Receptor Expressed in Neurogenic Regions of the Developing Cerebral Cortex," The Journal of Cell Biology, 1996, 135 (4), 1071-1083.

(56) References Cited

OTHER PUBLICATIONS

Hill, C. et al., "Epithelial Mesenchymal Transition Contributes to Pulmonary Fibrosis via Aberrant Epithelial/Fibroblastic Crosstalk," Europe PMC Funders Group, Author Manuscript, available in PMC 2019, face of article states: Published in final edited form as: J Lung Health Dis. 2019, 3 (2), 31-35, 7 pages.
Hostettler, K. et al., "Anti-fibrotic Effects of Nintedanib in Lung Fibroblasts Derived from Patients with Idiopathic Pulmonary Fibrosis," Respiratory Research, 2014, 15, 157, 9 pages, doi:10.1186/s12931-014-0157-3.
Inoue, M. et al., "Initiation of Neuropathic Pain Requires Lysophosphatidic Acid Receptor Signaling," Nature Medicine, 2004, 10 (7), 712-718 and Erratum.
Kaur, A. et al., "A Systematic Review, and Meta-Analyses, of the Impact of Health-related Claims on Dietary Choices," International Journal of Behavioral Nutrition and Physical Activity, 2017, 14, 93, 17 pages, doi:10.1186/s12966-017-0548-1.
Kerins, F. et al., "Generation of Substituted Styrenes via Suzuki Cross-coupling of Aryl Halides with 2,4,6-Trivinylcyclotriboroxane," Journal of Organic Chemistry, 2002, 67, 4968-4971.
Kocienski, P., Protecting Groups, George Thieme Verlag Stuttgart, New York, 1994.
Komachi, M. et al., "Orally Active Lysophosphatidic Acid Receptor Antagonist Attenuates Pancreatic Cancer Invasion and Metastasis in vivo," Cancer Science, 2012, 103 (6), 1099-1104.
Kropp, B. et al., "Characterization of Cultured Bladder Smooth Muscle Cells: Assessment of in vitro Contractility," The Journal of Urology, 1999, 162, 1779-1784.
Kuner, R., "Central Mechanisms of Pathological Pain," Nature Medicine, 2010, 16 (11), 1258-1266.
Lehtonen, S. et al. "Pirfenidone and Nintedanib Modulate Properties of Fibroblasts and Myofibroblasts in Idiopathic Pulmonary Fibrosis," Respiratory Research, 2016, 17:14, 12 pages, doi:10.1186/s12931-016-0328-5.
Li, H. et al., "Blocking Lysophosphatidic Acid Receptor 1 Signaling Inhibits Diabetic Nephropathy in db/db Mice," Kidney International, 2017, 91, 1362-1373.
Lin, S. et al., "Lysophosphatidic Acid Receptor 1 is Important for Intestinal Epithelial Barrier Function and Susceptibility to Colitis," The American Journal of Pathology, Accepted Manuscript, 2017, 40 pages, doi: 10.1016/j.ajpath.2017.10.006.
Liu, Y. et al. "Highly Controlling Selectivity of Copper(I)-catalyzed Azide/Alkyne Cycloaddition (CuAAC) between Sulfonyl Azids and Normal Alkynes or Propynoates," Tetrahedron, 2011, 67, 6294-6299.
Lv, M. et al., "Current Advances in Idiopathic Pulmonary Fibrosis: The Pathogensis, Therapeutic Strategies and Candidate Molecules," Future Medicinal Chemistry, 2019, 11 (19), 2595-2620.
Matsushita, H. et al., "Palladium-Catalyzed Reactions of Allylic Electrophiles with Organometallic Reagents. A Regioselective 1,4-Elimination and a Regio- and Stereoselective Reduction of Allylic Derivatives," Journal of Organic Chemistry, 1982, 47 (21), 4161-4165.
McDonough, J. et al., "Transcriptional Regulatory Model of Fibrosis Progression in the Human Lung," JCI Insight, 2019, 4 (22):e131597, 16 pages, https://doi.org/10.1172/jci.insight.131597.
Möbus, K. et al., "Hydrogenation of Aromatic Nitrogroups with Precious Metal Powder Catalysts: Influence of Modifier on Selectivity and Activity," Topics in Catalysis, 2010, 53, 1126-1131.
Montalbetti, C. et al., "Amide Bond Formation and Peptide Coupling," Tetrahedron, 2005, 61, 10827-10852.
Moolenaar, W. et al., "The Ins and Outs of Lysophosphatidic Acid Signaling," BioEssays, 2004, 26, 870-881.
Nagai, J. et al., "Autotaxin and Lysophosphatidic Acid$_1$ Receptor-mediated Demyelination of Dorsal Root Fibers by Sciatic Nerve Injury and Intrathecal Lysophosphatidylcholine," Molecular Pain, 2010, 6:78, 11 pages, doi:10.1186/1744-8069-6-78.
Nanthakumar, C. et al., "Dissecting Fibrosis: Therapeutic Insights from the Small-molecule Toolbox," Nature Reviews, Drug Discovery, 2015, 14, 693-720.
Onorato, J. et al., "Challenges in Accurate Quantitation of Lysophosphatidic Acids in Human Biofluids," Journal of Lipid Research, 2014, 55, 1784-1796.
Peyser, R. e al., "Defining the Activated Fibroblast Population in Lung Fibrosis Using Single-Cell Sequencing," American Journal of Respiratory Cell and Molecular Biology, 2019, 61 (1), 74-85.
Pradere, J-P. et al., "LPA$_1$ Receptor Activation Promotes Renal Interstitial Fibrosis," Journal of the American Society of Nephrology, 2007, 18, 3110-3118.
Rancoule, C. et al., "Lysophosphatidic Acid-1-receptor Targeting Agents for Fibrosis," Expert Opinion on Investigational Drugs, 2011, 20 (5), 657-667.
Remington, The Science and Practice of Pharmacy, 21st Edition, 2005, Part 5, "Pharmaceutical Manufacturing," published by Lippincott Williams & Wilkins.
Reyfman, P. et al., "Single-Cell Transcriptomic Analysis of Human Lung Provides Insights into the Pathobiology of Pulmonary Fibrosis," American Journal of Respiratory and Critical Care Medicine, 2019, 199 (12), 1517-1536.
Rockey, D. et al., "Fibrosis—A Common Pathway to Organ Injury and Failure," New England Journal of Medicine, 2015, 372 (12), 1138-1149.
Sakamoto, K. et al., "Effect of ASP6432, a Novel Type 1 Lysophosphatidic Acid Receptor Antagonist, on Urethral Function and Prostate Cell Proliferation" The Journal of Pharmacology and Experimental Therapeutics, 2018, 366, 390-396.
Simon, M. et al., "Lysophosphatidic Acid Inhibits Adipocyte Differentiation via Lysophosphatidic Acid 1 Receptor-dependent Downregulation of Peroxisome Proliferator-activated Receptor $_\gamma 2*$," The Journal of Biological Chemistry, 2005, 280 (15), 14656-14662.
Sperry, J. et al., "A Safe and Practical Procedure for the Difluoromethylation of Methyl 4-Hydroxy-3-iodobenzoate," Organic Process Research & Development, 2011, 15, 721-725.
Stahl, P. et al., Eds., Handbook of Pharmaceutical Salts. Properties, Selection and Use, Wiley-VCH, 2008.
Stepan, A. et al., "Application of the Bicyclo[1.1.1]pentane Motif as a Nonclassical Phenyl Ring Bioisostere in the Design of a Potent and Orally Active $_\gamma$-Secretase Inhibitor," Journal of Medicinal Chemistry, 2012, 55, 3414-3424.
Stoddard, N. et al., "Promising Pharmacological Directions in the World of Lysophosphatidic Acid Signaling," Biomolecules & Therapeutics, 2015, 23 (1), 1-11.
Tager, A. et al., "The Lysophosphatidic Acid Receptor LPA$_1$ Links Pulmonary Fibrosis to Lung Injury by Mediating Fibroblast Recruitment and Vascular Leak," Nature Medicine, 2008, 14 (1), 45-54.
Thomoson, C. et al., "Use of Fluoroform as a Source of Difluorocarbene in the Synthesis of N—CF$_2$H Heterocycles and Difluoromethoxypyridines," Journal of Fluorine Chemistry, 2014, 168, 34-39.
Valeur, E. et al., "Amide Bond Formation: Beyond the Myth of Coupling Reagents," Chemical Society Reviews, 2009, 38, 606-631.
Van Leeuwen, F. et al., "Lysophosphatidic Acid: Mitogen and Motility Factor," Biochemical Society Transactions, 2003, 31 (6), 1209-1212.
Watanabe, N. et al., "Both Plasma Lysophosphatidic Acid and Serum Autotaxin Levels are Increased in Chronic Hepatitis C," Journal of Clinical Gastroenterology, 2007, 41 (6), 616-623.
Watanabe, N. et al., "Plasma Lysophosphatidic Acid Level and Serum Autotaxin Activity are Increased in Liver Injury in Rats in Relation to Its Severity," Life Sciences, 2007, 81, 1009-1015.
Weigle, S. et al., "Primary Cell-based Phenotypic Assays to Pharmacologically and Genetically Study Fibrotic Diseases in vitro," Journal of Biological Methods, 2019, 6 (2), e115, 11 pages, doi:10.14440/jbm.2019.285.
Wouters, J. et al., Eds., Pharmaceutical Salts and Co-crystals, RSC Publishing, 2012.
Yamada, T. et al., "Lysophosphatidic Acid Stimulates the Proliferation and Motility of Malignant Pleural Mesothelioma Cells Through Lysophosphatidic Acid Receptors, LPA$_1$ and LPA$_2$," Cancer Science, 2008, 99 (8), 1603-1610.

(56) References Cited

OTHER PUBLICATIONS

Yang, C. et al., "The Role of Lysophosphatidic Acid Receptor ($LPA_1$) in the Oxygen-Induced Retinal Ganglion Cell Degeneration," Investigative Ophthalmology & Visual Science, 2009, 50 (3), 1290-1298.
Zeng, Y. et al., "Gene Expression Profiles of Lysophosphatidic Acid-Related Molecules in the Prostate: Relevance to Prostate Cancer and Benign Hyperplasia," The Prostate, 2009, 69, 283-292.
Zhao, Y. et al., "Lysophosphatidic Acid (LPA) and Its Receptors: Role in Airway Inflammation and Remodeling," Biochimica et Biophysica Acta, 2013, 1831, 86-92.
PubChem, Compound Summary, PubChem CID 73424720, Create date listed as Apr. 11, 2014, Modify date listed as Nov. 12, 2022, 9 pages, retrieved on Nov. 17, 2022, from: https://pubchem.ncbi.nlm.nih.gov/compound/73424720.
PubChem, Compound Summary, PubChem CID 117879891, Create date listed as Feb. 23, 2016, Modify date listed as Nov. 12, 2022, 10 pages, retrieved on Nov. 17, 2022, from: https://pubchem.ncbi.nlm.nih.gov/compound/117879891.

\* cited by examiner

COMBINATION OF AN AZETIDINE LPA1 RECEPTOR ANTAGONIST WITH PIRFENIDONE AND/OR NINTEDANIB FOR USE IN THE TREATMENT OF FIBROTIC DISEASES

CROSS REFERENCE TO RELATED APPLICATIONS

This application is the National Stage Entry under 35 U.S.C. § 371 of International Application No. PCT/EP2020/084401 filed Dec. 3, 2020, which claims priority to International Application No. PCT/EP2019/083757 filed Dec. 4, 2019, the contents of each of which are hereby incorporated by reference in their entireties.

The present invention concerns the compounds of formula (I)

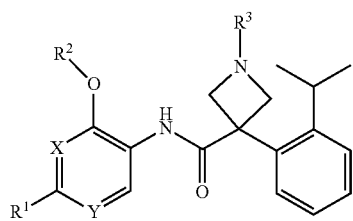

Formula (I)

and their use as antagonists of the $LPA_1$ receptor, in combination with one or more therapeutically active ingredients acting as anti-fibrotic agent(s); such as especially pirfenidone in the prevention and/or treatment of fibrotic diseases (and/or diseases or disorders associated with fibrosis); wherein such fibrotic disease is especially pulmonary fibrosis, in particular idiopathic pulmonary fibrosis or pulmonary fibrosis secondary to systemic inflammatory disease. The invention further relates to pharmaceutical compositions comprising the compounds of formula (I) in combination with one or more therapeutically active ingredients acting as anti-fibrotic agent(s) such as pirfenidone or nintedanib, especially pirfenidone.

Certain compounds of formula (I) are disclosed as antagonists of the $LPA_1$ receptor in WO2019234115 (PCT/EP2019/064690) and PCT/EP2020/066767 and may be useful for the prevention and/or treatment of fibrosis (and diseases or disorders associated with fibrosis), or of other disorders mediated by $LPA_1$ receptor signalling. In particular said compounds are disclosed as being of potential use in the prevention and/or treatment of pulmonary fibrosis including fibrosing interstitial lung diseases, including idiopathic pulmonary fibrosis;

pulmonary fibrosis secondary to systemic inflammatory disease such as rheumatoid arthritis, scleroderma (systemic sclerosis; SSc), lupus (systemic lupus erythematosus; SLE), polymyositis, or mixed connective tissue disease (MCTD); pulmonary fibrosis secondary to sarcoidosis; iatrogenic pulmonary fibrosis including radiation-induced fibrosis; silicosis-induced pulmonary fibrosis; asbestos-induced pulmonary fibrosis; and pleural fibrosis;

renal fibrosis; including renal fibrosis associated with CKD, chronic renal failure, tubulointerstitial nephritis, and/or chronic nephropathies such as (primary) glomerulonephritis and glomerulonephritis secondary to systemic inflammatory diseases such as lupus (SLE) and scleroderma (SSc), diabetes, focal segmental glomerular sclerosis, IgA nephropathy, hypertension, renal allograft, and Alport syndrome;

gut fibrosis, including gut fibrosis secondary to scleroderma, and radiation-induced gut fibrosis;

liver fibrosis, including cirrhosis, alcohol-induced liver fibrosis, nonalcoholic steatohepatitis, biliary duct injury, primary biliary cirrhosis (also known as primary biliary cholangitis), infection- or viral-induced liver fibrosis (e.g. chronic HCV infection), and autoimmune hepatitis;

head and neck fibrosis, including radiation-induced head and neck fibrosis;

corneal scarring, including sequelae of LASIK (laser-assisted in situ keratomileusis), corneal transplant, and trabeculectomy;

hypertrophic scarring and keloids, including burn-induced or surgical hypertrophic scarring and keloids;

and other fibrotic diseases, e.g. endometriosis, spinal cord fibrosis, myelofibrosis, cardiac fibrosis, perivascular fibrosis; as well as formation of scar tissue, Peyronie's disease, abdominal or bowel adhesions, bladder fibrosis, and fibrosis of the nasal passages.

Fibrosis is a process of pathological, excessive extracellular matrix deposition, which includes deposition and cross-linking of different collagen subtypes, and distorted tissue architecture. Fibrosis is a main contributor to organ dysfunction in a variety of diseases.

Cell damage and/or death, as a result of injury, usually triggers a restorative process, leading to the re-establishment of the original tissue architecture and functionality. However, chronic injury and in some cases even an acute injury, can lead to the development of fibrosis, loss of normal tissue architecture and loss of organ function. Fibrosis is recognized as a major contributor to morbidity and mortality, especially in diseases of the lung, liver, heart, kidney and skin (Nanthakumar et al., Nat Rev Drug Discov. 2015; 14(10):693-720). For the majority of fibrotic diseases there is currently no effective therapy available. Two drugs (nintedanib, a tyrosine kinase inhibitor; and pirfenidone) were recently approved to treat patients with idiopathic pulmonary fibrosis (IPF) and both compounds were shown to slow the rate of disease progression, although they do not offer a cure. Therefore, additional treatments modalities are urgently needed to treat patients with IPF, and other fibrotic diseases.

During the past few years, a molecular understanding of potential genetic risk factors (Kaur et al., 2014) and mechanisms leading to IPF progression (McDonough et al, JCI Insight. 2019; 4 (22). doi: 10.1172/jci.insight.131597; Reyfman et al., Am J Respir Crit Care Med. 2019; 199(12):1517-1536) emerged. Epithelial damage and subsequent infiltration of inflammatory cells triggers differentiation of resident fibroblast to a pro-inflammatory and pro-fibrotic myofibroblast phenotype that proliferates, resists apoptosis and secretes excess extracellular matrix (ECM) proteins. Tissue stiffening further stimulates mechanosensing myofibroblasts to create a self-amplifying pro-fibrotic status (Lv et al., Future Med Chem 2019; 11:2595-2620). Consequently, myofibroblasts are today considered the major cellular effector of the fibrotic response. Epithelial-mesenchymal transition (Hill et al., J Lung Health Dis. 2019; 3(2):31-35) and infiltrating fibrocytes (Chong et al., Int J Biochem Cell Biol. 2019; 116:105595) have been proposed to enlarge the pool of fibroblastic cells that can differentiate into a myofibroblast phenotype. Thus, targeting fibroblasts that are prone to differentiate into myofibroblasts or suppressing myofibroblast activity are emerging strategies to treat a progressing fibrotic disease.

In IPF, epithelial injury triggers many different signals that contribute to the differentiation of fibroblasts to a myofibroblast phenotype, which is characterized by increased expression of alpha smooth muscle actin (αSMA), appearance of αSMA stress fibers, increased ECM protein secretory activity and secretion of pro-inflammatory cytokines, which further exacerbate the fibrotic condition. Amongst the known cytokines that trigger fibroblast to myofibroblast transition, TGFβ and its downstream effectors are the most potent and most prominent fibrosis inducers, although other factors, including TNFα, PDGFα, IL-1, IL-6 and lysophosphatidic acid (LPA), also contribute (Alsafadi et al., Am J Physiol Lung Cell Mol Physiol. 2017; 312 (6):L896-L902; Peyser et al. Am J Respir Cell Mol Biol. 2019; 61(1):74-85; Distler et al., Nat Rev Rheumatol. 2019; 15:705-730).

The pro-fibrotic conditions and consequences on lung fibroblast phenotypes can be mimicked in vitro using exogenous stimuli such as TGFβ, PDGFα or LPA on primary human lung fibroblasts and pharmacological interventions can be tested for efficacy. Based on the secretory activity and gene expression analysis, the in vitro-induced myofibroblast phenotype is in good agreement with the phenotype of IPF-derived (myo)fibroblasts in vivo (Weigle et al, J Biol Methods. 2019; 6 (2):e115).

The $LPA_1$ receptor antagonist BMS-986020 (CAS Reg. No.: 1257213-50-5; WO2010/141761, WO2012/7078805, hereinafter also called Compound D) has been tested in a phase II clinical trial (NCT01766817) in IPF patients. Patients treated with BMS-986020 b.i.d. experienced a significantly slower rate of decline in forced vital capacity (FVC) versus placebo. FVC is the total amount of air exhaled during the forced expiratory volume test that is measured during spirometry; and may be considered the most important measurement of lung function. Dose-related elevations in hepatic enzymes were observed in both BMS-986020 treatment groups. The study was terminated early because of three cases of cholecystitis that were determined to be related to BMS-986020 after unblinding.

Nintedanib ((3Z)-2,3-dihydro-3-[[[4-[methyl-[(4-methyl-1-piperazinyl)-acetyl]-amino]-phenyl]-amino]-phenylmethylene]-2-oxo-1H-indole-6-carboxylic acid methyl ester ethanesulfonate; see for example U.S. Pat. Nos. 6,762,180, 7,119,093, 7,989,474, 9,907,756, 10,105,323, 10,154,990) is a triple kinase inhibitor that targets the receptor tyrosine kinases fibroblast growth factor receptor (FGFR), platelet-derived growth factor receptor (PDGFR), and vascular endothelial growth factor receptor (VEGFR), which have also been implicated in the pathogenesis of fibrosis and IPF. In two phase III trials, nintedanib reduced the decline in lung function by approximately 50% over one year. Nintedanib hard gelatine capsules contain for example nintedanib (150 mg or 100 mg), and the inactive ingredients medium-chain hard fat triglycerides, and soya lecithin (E322). It was approved by the US FDA in 2014 and in Europe in 2015. In the US, it is indicated for the treatment of idiopathic pulmonary fibrosis (IPF), and for slowing the rate of decline in pulmonary function in patients with systemic sclerosis-associated interstitial lung disease (SSc-ILD). Recommended dosage is 150 mg twice daily (b.i.d.) approximately 12 hours apart taken with food. Recommended dosage in patients with mild hepatic impairment (Child Pugh A) is 100 mg b.i.d. approximately 12 hours apart taken with food. Temporary dose reduction to 100 mg, treatment interruption, or discontinuation for management of adverse reactions is to be considered, and prior to treatment initiation, liver function tests in all patients and a pregnancy test in females of reproductive potential are recommended. Elevated liver enzymes and drug-induced liver injury: ALT, AST, and bilirubin elevations have occurred with nintedanib, including cases of drug-induced liver injury. In the postmarketing period, non-serious and serious cases of drug-induced liver injury, including severe liver injury with fatal outcome, have been reported. Further potential side effects of nintedanib are reported to include gastrointestinal disorders such as diarrhea, nausea, and vomiting; embryo-fetal toxicity; arterial thromboembolic events; bleeding events; and gastrointestinal perforation. In the EU, nintedanib is indicated for the treatment of idiopathic pulmonary fibrosis (IPF), and it is further indicated in combination with docetaxel for the treatment of adult patients with locally advanced, metastatic or locally recurrent non-small cell lung cancer (NSCLC) of adenocarcinoma tumour histology after first-line chemotherapy; wherein the recommended dose of nintedanib is 200 mg twice daily administered approximately 12 hours apart, on days 2 to 21 of a standard 21-day docetaxel treatment cycle.

According to www.clinicaltrials.gov, nintedanib is/has been tested in clinical trials directed to IPF in combination with pirfenidone; as well as in scleroderma related lung fibrosis; progressive fibrosing interstitial lung disease (PF-ILD); and bronchiolitis obliterans syndrome following hematopoietic stem cell transplantation; and in several studies directed to cancer including for example thyroid cancer; non-small cell lung cancer; small cell lung cancer; esophagogastric cancer; malignant pleural mesothelioma that is recurrent; HER2-negative metastatic inflammatory breast cancer (MIBC); soft tissue sarcoma; advanced ovarian cancer; recurrent or persistent endometrial cancer; lung cancer; metastatic appendiceal carcinoma; endometrial cancer, pleural malignant mesothelioma; and refractory metastatic colorectal cancer.

Pirfenidone (5-methyl-1-phenyl-2-(1H)-pyridone) is indicated for the treatment of IPF. Pirfenidone hard gelatine capsules contain pirfenidone (267 mg), and the inactive ingredients microcrystalline cellulose, croscarmellose sodium, povidone, and magnesium stearate. Pirfenidone film-coated tablets contain pirfenidone [267 mg (yellow) and 801 mg (brown)] and the inactive ingredients microcrystalline cellulose, colloidal anhydrous silica, povidone, croscarmellose sodium, magnesium stearate, polyvinyl alcohol, titanium dioxide, macrogol (polyethylene glycol), talc, and iron oxide.

The recommended dosage of pirfenidone is 801 mg three times a day (t.i.d), corresponding to 2403 mg/day; wherein uptitration over 14 days starting from a 267 mg t.i.d. dose is recommended upon initation of treatment or after treatment interruption. Prior to treatment, conduction of liver function tests (alanine transaminase (ALT), aspartate transaminase (AST), and bilirubin) is recommended.

Cases of drug-induced liver injury (DILI) have been observed with pirfenidone. In the postmarketing period, non-serious and serious cases of DILI, including severe liver injury with fatal outcome, have been reported. Patients treated with pirfenidone 2403 mg/day in three Phase 3 trials had a higher incidence of elevations in ALT or AST≥3× upper limit of normal (ULN) than placebo patients (3.7% vs 0.8%, respectively). Elevations≥10×ULN in ALT or AST occurred in 0.3% of patients in the pirfenidone 2403 mg/day group and in 0.2% of patients in the placebo group. Increases in ALT and AST≥3×ULN were reversible with dose modification or treatment discontinuation.

In consequence, temporary dosage reduction, treatment interruption, or discontinuation for management of adverse reactions such as DILI are recommended. Furthermore, dosage reduction or discontinuation may also be necessary in some cases of photosensitivity reaction or rash; as well as in some cases of gastrointestinal adverse reactions. In the clinical studies, gastrointestinal events of nausea, diarrhea, dyspepsia, vomiting, gastro-esophageal reflux disease, and abdominal pain were more frequently reported by patients in the pirfenidone treatment groups than in those taking placebo. Dosage reduction or interruption for gastrointestinal events was required in 18.5% of patients in the 2403 mg/day group, as compared to 5.8% of patients in the placebo group; 2.2% of patients in the pirfenidone 2403 mg/day group discontinued treatment due to a gastrointestinal event, as compared to 1.0% in the placebo group.

Several patents relate to pirfenidone, uses thereof, as well as to methods of mitigating certain of the above-mentioned liabilities (see for example U.S. Pat. Nos. 7,566,729, 7,635,707, 7,696,236, 7,767,225, 7,767,700, 7,816,383, 7,910,610, 7,988,994, 8,013,002, 8,084,475, 8,318,780, 8,383,150, 8,420,674, 8,592,462, 8,609,701, 8,648,098, 8,753,679, 8,754,109, 8,778,947). Pirfenidone has further been claimed to be useful in certain anti-fibrotic therapies in selected patients (WO2012/162592).

According to www.clinicaltrials.gov, pirfenidone is/has been tested in clinical trials directed to rheumatoid arthritis associated interstitial lung disease (RA-ILD), radiation-induced lung injury, chronic kidney disease (CKD), diabetic kidney disease, diabetic nephropathy, progressive interstitial lung disease associated with clinically amyopathic dermatomyositis, pulmonary fibrosis with anti-myeloperoxydase (MPO) antibodies or pulmonary fibrosis with anti-MPO associated vasculitis, systemic sclerosis-associated interstitial lung disease (SSc-ILD), progressive fibrotic sarcoidosis, advanced liver fibrosis, skin fibrosis in systemic sclerosis, interstitial lung disease associated with systemic sclerosis, and fibrosis caused by radiation therapy for cancer. In Mexico orally administered pirfenidone was approved for the treatment of pulmonary fibrosis and liver fibrosis, and in form of a gel for the treatment of scars, fibrotic tissue and skin ulcers.

Furthermore, development of fibrosis, especially of pulmonary fibrosis may be one of the possible sequelae of COVID-19, especially of moderate or severe COVID-19. In consequence, clinical trials were recently disclosed studying nintedanib and pirfenidone in the context of COVID-19, especially in post-COVID-19 pulmonary fibrosis (see for example NCT04607928, NCT04541680, NCT04338802, NCT04619680).

In preclinical models, the general anti-fibrotic effect of pirfenidone has been widely established in animal models of pulmonary, cardiac, renal, and hepatic fibrosis, as well as in Dupuytren's contracture. Pirfenidone demonstrated a consistent ability to reduce fibrosis and the expression of fibrogenic mediators.

Nintedanib and pirfenidone were both tested for their anti-fibrotic activity in vitro, using primary human lung (myo)fibroblasts in various conditions (Atanelishvili et al, Clin Exp Rheumatol. 2019; 37 Suppl 119(4):115-124; Lehtonen et al., Respir Res. 2016; 17:14; Hostettler et al., Respir Res. 2014; 15:157). Both compounds attenuated, but usually did not fully inhibit, fibroblast to myofibroblast differentiation and/or the pro-fibrotic activity of (myo)fibroblasts. These results demonstrate that such an in vitro system is appropriate to evaluate compounds for anti-fibrotic activity, but also confirms that multiple signals and signaling pathways converge to induce a pro-fibrotic phenotype in these cells. It furthermore suggests that neither pirfenidone nor nintedanib might be able to reach a maximal effect even at high concentration.

In particular for pirfenidone, which is administered in humans at a high dose of three times 801 mg/day orally (total of 2403 mg/day), the concentrations that are used to observe significant effects (>0.5 mM) in vitro are in line with the need for high compound exposures in humans. These findings highlight the need for additional treatments that can be used on top of currently available background therapy (i.e. pirfenidone and/or nintedanib, and optionally further background therapy) and which may, in combination, increase the efficacy of such anti-fibrotic therapy.

It has now been found that $LPA_1$ receptor antagonists such as especially the compounds of formula (I) as defined below, which are $LPA_1$ receptor antagonists having potential in the prevention and treatment of fibrotic diseases and disorders (such as pulmonary fibrosis; renal fibrosis; gut fibrosis; liver fibrosis; head and neck fibrosis; corneal scarring; hypertrophic scarring and keloids; and other fibrotic diseases mentioned herein, including endometriosis, spinal cord fibrosis, myelofibrosis, cardiac fibrosis, perivascular fibrosis; formation of scar tissue, Peyronie's disease, abdominal or bowel adhesions, bladder fibrosis, fibrosis of the nasal passages, and fibrosis mediated by fibroblasts) may have complementary, and even synergistic effect when combined with pirfenidone in the treatment of such fibrotic diseases and disorders. Such combination may, thus, especially be useful in the prevention and/or treatment of pulmonary fibrosis (especially IPF). Furthermore, the combination of an $LPA_1$ receptor antagonist such as especially a compound of formula (I) with pirfenidone may allow for a dose reduction of pirfenidone, potentially even to dosages that are below established optimally efficacious dosages of pirfenidone when administered alone, thus, potentially mitigating certain safety liabilities associated with the high dose (2403 mg/day which is generally administered as 801 mg t.i.d.) of pirfenidone (for example the effect on liver enzymes, photosensitivity, rash, or gastro-intestinal side effects).

$LPA_1$ receptor antagonists such as especially the compounds of formula (I) as defined below may furthermore have at least complementary effect when combined with nintedanib in the treatment of such fibrotic diseases and disorders. The present $LPA_1$ receptor antagonists may in addition be combined with both pirfenidone and nintedanib in a triple combination prevention and/or treatment of such fibrotic diseases.

DETAILED DESCRIPTION OF THE INVENTION

Figure 1:
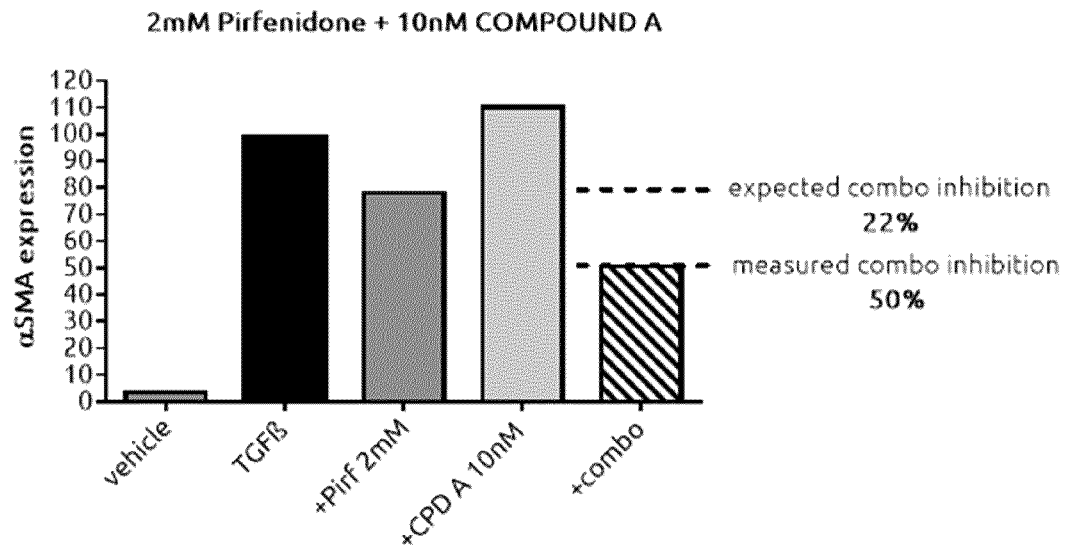
FIG. 1 shows the effect of COMPOUND A, pirfenidone, and their combination on TGFβ-induced αSMA expression in human fibroblasts.
Figure 2:
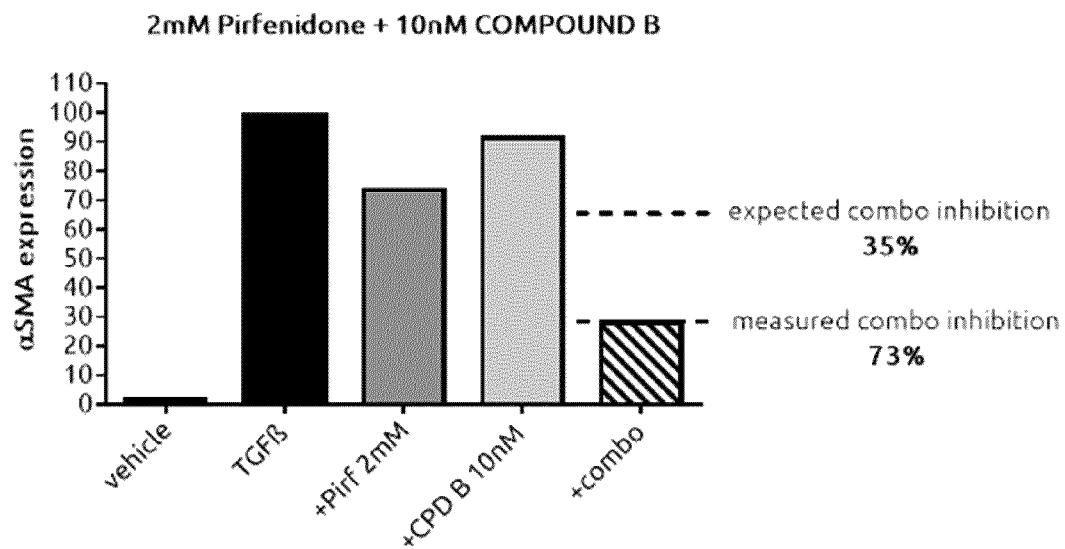
FIG. 2 shows the effect of COMPOUND B, pirfenidone, and their combination on TGFβ-induced αSMA expression in human fibroblasts.
Figure 3:
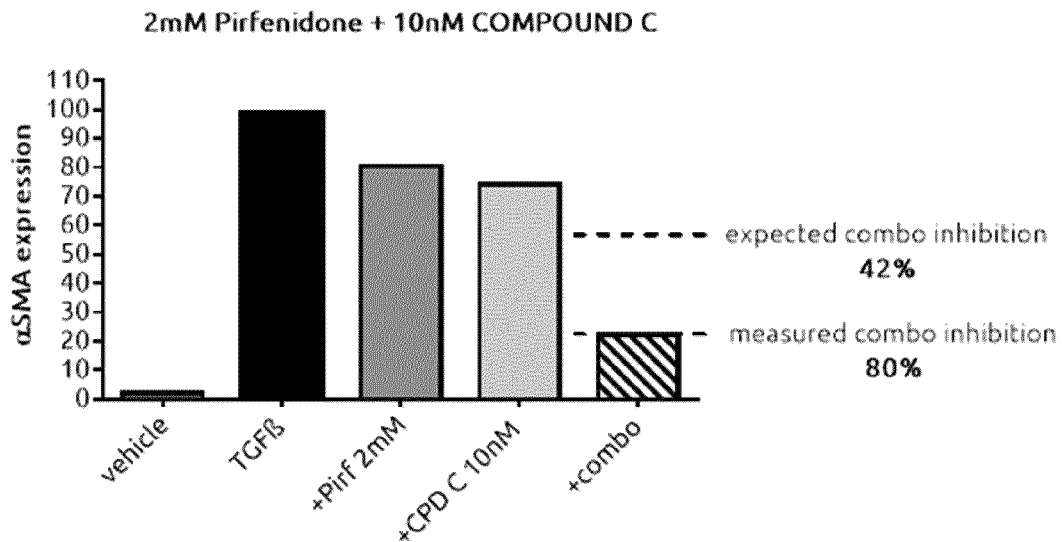
FIG. 3 shows the effect of COMPOUND C, pirfenidone, and their combination on TGFβ-induced αSMA expression in human fibroblasts.
Figure 4:
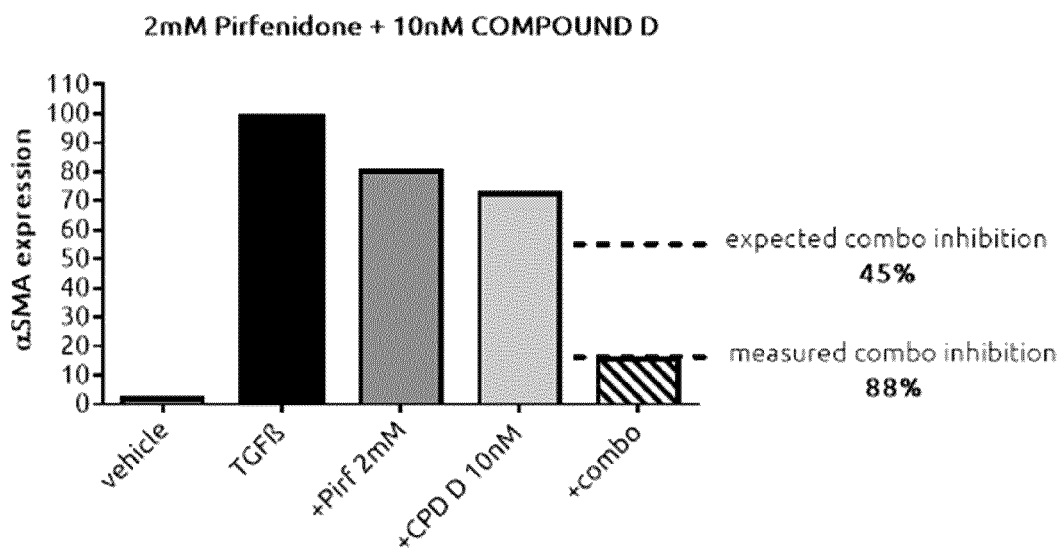
FIG. 4 shows the effect of COMPOUND D, pirfenidone, and their combination on TGFβ-induced αSMA expression in human fibroblasts.

1) A first embodiment relates to a pharmaceutical composition comprising, as active principles, a compound of Formula (I):

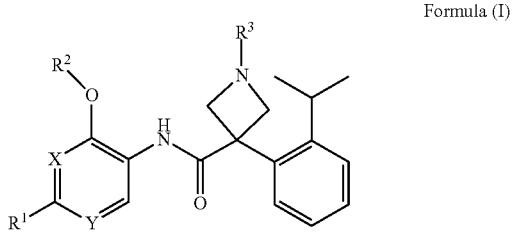

Formula (I)

wherein
X is CH; Y is N; and $R^2$ is methyl, ethyl, or isopropyl (especially methyl); or
X is N; Y is CH; and $R^2$ is methyl, ethyl, or isopropyl (especially methyl), or difluoromethyl;
$R^1$ is fluoro, chloro, bromo, or methyl (especially chloro or methyl); and
$R^3$ represents
—$(CH_2)_{2-3}$—$C(CH_3)_2$—COOH (especially —$CH_2$—$CH_2$—$C(CH_3)_2$—COOH);
—CO—$(CH_2)_{1-2}$—$C(CH_3)_2$—COOH (especially —CO—$CH_2$—$C(CH_3)_2$—COOH); or
—$SO_2$—$NH_2$;

or a pharmaceutically acceptable salt thereof;
in combination with one or more therapeutically active ingredients acting as anti-fibrotic agent(s); wherein said anti-fibrotic agent(s) is/are especially pirfenidone and/or nintedanib; or a pharmaceutically acceptable salt thereof; as well as at least one pharmaceutically acceptable excipient.

The pharmaceutical composition according to embodiment 1) can be used as medicament, e.g. in the form of pharmaceutical compositions for enteral (such especially oral) or parenteral administration (including topical application or inhalation). The production of such pharmaceutical composition can be effected in a manner which will be familiar to any person skilled in the art (see for example Remington, *The Science and Practice of Pharmacy*, 21 st Edition (2005), Part 5, "Pharmaceutical Manufacturing" [published by Lippincott Williams & Wilkins]) by bringing the combination active ingredients of the present invention, optionally in combination with other therapeutically valuable substances, into a galenical administration form together with suitable, non-toxic, inert, pharmaceutically acceptable solid or liquid carrier materials and, if desired, usual pharmaceutical adjuvants. A pharmaceutical composition for oral administration may in particular be in form of a capsule or tablet.

2) A further embodiment relates to a pharmaceutical composition according to embodiment 1), wherein in the compounds of Formula (I)
X is CH; Y is N; and $R^2$ is methyl, ethyl, or isopropyl (especially methyl); or
X is N; Y is CH; and $R^2$ is methyl or difluoromethyl (especially difluoromethyl).

3) A further embodiment relates to a pharmaceutical composition according to embodiment 1), wherein X is CH; Y is N; and $R^2$ is methyl, ethyl, or isopropyl (especially methyl).

4) A further embodiment relates to a pharmaceutical composition according to embodiment 1), wherein X is N; Y is CH; and $R^2$ is difluoromethyl.

5) A further embodiment relates to a pharmaceutical composition according to any one of embodiments 1) to 4) [especially according to embodiment 3)], wherein $R^1$ is fluoro, chloro, or bromo (especially chloro).

6) A further embodiment relates to a pharmaceutical composition according to any one of embodiments 1) to 4) [especially according to embodiment 4)], wherein $R^1$ is methyl.

7) A further embodiment relates to a pharmaceutical composition according to any one of embodiments 1) to 6), wherein $R^3$ represents
—$CH_2$—$CH_2$—$C(CH_3)_2$—COOH;
—CO—$CH_2$—$C(CH_3)_2$—COOH; or
—$SO_2$—$NH_2$.

8) A further embodiment relates to a pharmaceutical composition according to any one of embodiments 1) to 6) [especially according to embodiment 4) or 6)], wherein $R^3$ represents —$(CH_2)_{2-3}$—$C(CH_3)_2$—COOH, (especially —$CH_2$—$CH_2$—$C(CH_3)_2$—COOH).

9) A further embodiment relates to a pharmaceutical composition according to any one of embodiments 1) to 6) [especially according to embodiment 4) or 6)], wherein $R^3$ represents —CO—$(CH_2)_{1-2}$—$C(CH_3)_2$—COOH (especially —CO—$CH_2$—$C(CH_3)_2$—COOH).

10) A further embodiment relates to a pharmaceutical composition according to any one of embodiments 1) to 6) [especially according to embodiment 3) or 5)], wherein $R^3$ represents —$SO_2$—$NH_2$.

11) A further embodiment relates to a pharmaceutical composition according to embodiment 1), wherein in the compound of Formula (I) is:
4-(3-((2-(difluoromethoxy)-6-methylpyridin-3-yl)carbamoyl)-3-(2-isopropylphenyl)azetidin-1-yl)-2,2-dimethylbutanoic acid;
5-(3-((2-(difluoromethoxy)-6-methylpyridin-3-yl)carbamoyl)-3-(2-isopropylphenyl)azetidin-1-yl)-2,2-dimethylpentanoic acid;
4-(3-((2-(difluoromethoxy)-6-methylpyridin-3-yl)carbamoyl)-3-(2-isopropylphenyl)azetidin-1-yl)-2,2-dimethyl-4-oxobutanoic acid;
5-(3-((2-(difluoromethoxy)-6-methylpyridin-3-yl)carbamoyl)-3-(2-isopropylphenyl)azetidin-1-yl)-2,2-dimethyl-5-oxopentanoic acid;
N-(2-(difluoromethoxy)-6-methylpyridin-3-yl)-3-(2-isopropylphenyl)-1-sulfamoylazetidine-3-carboxamide;
3-(2-isopropylphenyl)-N-(2-methoxy-6-methylpyridin-3-yl)-1-sulfamoylazetidine-3-carboxamide;
N-(2-ethoxy-6-methylpyridin-3-yl)-3-(2-isopropylphenyl)-1-sulfamoylazetidine-3-carboxamide; or N-(2-isopropoxy-6-methylpyridin-3-yl)-3-(2-isopropylphenyl)-1-sulfamoylazetidine-3-carboxamide.

12) A further embodiment relates to a pharmaceutical composition according to embodiment 1), wherein in the compound of Formula (I) is:
4-(3-((6-chloro-4-methoxypyridin-3-yl)carbamoyl)-3-(2-isopropylphenyl)azetidin-1-yl)-2,2-dimethylbutanoic acid;
4-(3-((6-chloro-4-ethoxypyridin-3-yl)carbamoyl)-3-(2-isopropylphenyl)azetidin-1-yl)-2,2-dimethylbutanoic acid;
4-(3-(6-chloro-4-isopropoxypyridin-3-yl)carbamoyl)-3-(2-isopropylphenyl)azetidin-1-yl)-2,2-dimethylbutanoic acid;
4-(3-((6-bromo-4-methoxypyridin-3-yl)carbamoyl)-3-(2-isopropylphenyl)azetidin-1-yl)-2,2-dimethylbutanoic acid;
5-(3-((6-chloro-4-methoxypyridin-3-yl)carbamoyl)-3-(2-isopropylphenyl)azetidin-1-yl)-2,2-dimethylpentanoic acid;
5-(3-((6-chloro-4-ethoxypyridin-3-yl)carbamoyl)-3-(2-isopropylphenyl)azetidin-1-yl)-2,2-dimethylpentanoic acid;
4-(3-((6-chloro-4-methoxypyridin-3-yl)carbamoyl)-3-(2-isopropylphenyl)azetidin-1-yl)-2,2-dimethyl-4-oxobutanoic acid;
4-(3-((6-bromo-4-methoxypyridin-3-yl)carbamoyl)-3-(2-isopropylphenyl)azetidin-1-yl)-2,2-dimethyl-4-oxobutanoic acid;
4-(3-((6-chloro-4-ethoxypyridin-3-yl)carbamoyl)-3-(2-isopropylphenyl)azetidin-1-yl)-2,2-dimethyl-4-oxobutanoic acid;
N-(6-fluoro-4-methoxypyridin-3-yl)-3-(2-isopropylphenyl)-1-sulfamoylazetidine-3-carboxamide;
N-(6-chloro-4-methoxypyridin-3-yl)-3-(2-isopropylphenyl)-1-sulfamoylazetidine-3-carboxamide;
N-(6-chloro-4-ethoxypyridin-3-yl)-3-(2-isopropylphenyl)-1-sulfamoylazetidine-3-carboxamide;
N-(6-chloro-4-isopropoxypyridin-3-yl)-3-(2-isopropylphenyl)-1-sulfamoylazetidine-3-carboxamide;
N-(6-bromo-4-methoxypyridin-3-yl)-3-(2-isopropylphenyl)-1-sulfamoylazetidine-3-carboxamide; or
3-(2-isopropylphenyl)-N-(4-methoxy-6-methylpyridin-3-yl)-1-sulfamoylazetidine-3-carboxamide.

13) A further embodiment relates to a pharmaceutical composition according to embodiment 1), wherein in the compound of Formula (I) is:
4-(3-((2-(difluoromethoxy)-6-methylpyridin-3-yl)carbamoyl)-3-(2-isopropylphenyl)azetidin-1-yl)-2,2-dimethylbutanoic acid;
4-(3-((2-(difluoromethoxy)-6-methylpyridin-3-yl)carbamoyl)-3-(2-isopropylphenyl)azetidin-1-yl)-2,2-dimethyl-4-oxobutanoic acid; or
N-(6-chloro-4-methoxypyridin-3-yl)-3-(2-isopropylphenyl)-1-sulfamoylazetidine-3-carboxamide.

14) A further embodiment relates to a pharmaceutical composition according to embodiment 1), wherein in the compound of Formula (I) is N-(6-chloro-4-methoxypyridin-3-yl)-3-(2-isopropylphenyl)-1-sulfamoylazetidine-3-carboxamide.

15) A further embodiment relates to a pharmaceutical composition according to embodiment 1), wherein in the compound of Formula (I) is 4-(3-((2-(difluoromethoxy)-6-methylpyridin-3-yl)carbamoyl)-3-(2-isopropylphenyl)azetidin-1-yl)-2,2-dimethyl-4-oxobutanoic acid.

16) A further embodiment relates to a pharmaceutical composition according to any one of embodiments 1) to 15), wherein said one or more therapeutically active ingredients acting as anti-fibrotic agent(s) is pirfenidone, or a pharmaceutically acceptable salt thereof.

17) A further embodiment relates to a pharmaceutical composition according to any one of embodiments 1) to 15), wherein said composition comprises the compound of formula (I) and, in addition, two therapeutically active ingredients acting as anti-fibrotic agents, wherein said anti-fibrotic agents are pirfenidone, or a pharmaceutically acceptable salt thereof, in combination with nintedanib, or a pharmaceutically acceptable salt thereof.

18) A further embodiment relates to a pharmaceutical composition according to any one of embodiments 1) to 17), wherein pirfenidone, or a pharmaceutically acceptable salt thereof, is comprised in a pharmaceutical unit dosage suitable for the oral administration of pirfenidone, wherein pirfenidone, or a pharmaceutically acceptable salt thereof, is comprised in a pharmaceutical unit dosage suitable for the oral administration of a total of about 2403 mg per day or below (for example a total of about 801 mg t.i.d or below) of pirfenidone.

19) A further embodiment relates to a pharmaceutical composition according to any one of embodiments 1) to 18) wherein pirfenidone, or a pharmaceutically acceptable salt thereof, is comprised in a dose which is a tolerated efficacious dose or lower than a tolerated efficacious dose of pirfenidone when given as a single therapy (e.g. as indicated in an approval letter for pirfenidone for a certain disease or disorder when given as a single therapy).

20) A further embodiment relates to a pharmaceutical composition according to any one of embodiments 1) to 18), wherein pirfenidone, or a pharmaceutically acceptable salt thereof, is comprised in a dose which is lower than a tolerated efficacious dose of pirfenidone when given as a single therapy (e.g. as indicated in an approval letter for pirfenidone for a certain disease or disorder when given as a single therapy); wherein such dose may be a total of 1602 mg/day or below (for example 534 mg three times daily); especially a total of 801 mg/day (for example 267 mg three times daily).

21) A further embodiment relates to a pharmaceutical composition according to any one of embodiments 1) to 20), wherein said one or more therapeutically active ingredients acting as anti-fibrotic agent(s) is nintedanib, or a pharmaceutically acceptable salt thereof (such as especially the ethane-sulfonate).

22) A further embodiment relates to a pharmaceutical composition according to any one of embodiments 1) to 21), wherein nintedanib, or a pharmaceutically acceptable salt thereof (such as especially the ethane-sulfonate), if present, is comprised in a pharmaceutical unit dosage suitable for the oral administration of nintedanib, wherein nintedanib, or a pharmaceutically acceptable salt thereof, is comprised in a pharmaceutical unit dosage suitable for the oral administration of a total of about 200 mg per day or below (for example 100 mg b.i.d. or below), 300 mg per day or below (for example 150 mg b.i.d. or below), or 400 mg per day or below (for example 200 mg b.i.d. or below); of nintedanib.

23) A further embodiment relates to a pharmaceutical composition according to any one of embodiments 1) to 22), wherein nintedanib, or a pharmaceutically acceptable salt thereof, is comprised in a dose which is a tolerated efficacious dose or lower than a tolerated efficacious dose of nintedanib when given as a single therapy (e.g. as indicated in an approval letter for nintedanib for a certain disease or disorder when given as a single therapy).

24) A further embodiment relates to a pharmaceutical composition according to any one of embodiments 1) to 23), wherein nintedanib, or a pharmaceutically acceptable salt thereof, is comprised in a dose which is lower than a tolerated efficacious dose of nintedanib when given as a single therapy (e.g. as indicated in an approval letter for nintedanib for a certain disease or disorder when given as a single therapy); wherein such dose may be a total of 200 mg per day or below (for example 100 mg b.i.d.) of nintedanib.

Such combination pharmaceutical compositions according to embodiments 1) to 24) are especially useful for the prevention or treatment of fibrotic diseases as defined herein, in particular pulmonary fibrosis (especially IPF); and in a method for the prevention or treatment of fibrotic diseases as defined herein, in particular pulmonary fibrosis (especially IPF), said method comprising administering a pharmaceutically efficacious dose of such combination pharmaceutical composition to a subject (especially a human) in need thereof.

25) Another aspect of the present invention relates to the pharmaceutical compositions according to embodiments 1) to 24) for use in the prevention/prophylaxis of pulmonary fibrosis (especially IPF), wherein said prevention/prophylaxis of pulmonary fibrosis (especially IPF) comprises delaying the onset of pulmonary fibrosis (especially IPF) in a patient who has experienced a pneumonia or interstitial lung disease (ILD; alternatively named diffuse parenchymal lung disease (DPLD))/has been diagnosed as having experienced a pneumonia or ILD; wherein especially such pneumonia or ILD is interstitial pneumonia, in particular usual interstitial pneumonia.

26) In another aspect, the present invention relates to the pharmaceutical compositions according to embodiments 1) to 24) for use in the prevention/prophylaxis or treatment of pulmonary fibrosis, wherein
said prevention/prophylaxis of pulmonary fibrosis comprises delaying the onset of pulmonary fibrosis, and
said treatment of pulmonary fibrosis comprises slowing the rate of decline in pulmonary function;
wherein especially said prevention/prophylaxis or treatment of pulmonary fibrosis is performed in a subject who has (has been diagnosed as having) a systemic inflammatory disease such as rheumatoid arthritis, scleroderma (systemic sclerosis), lupus (systemic lupus erythematosus), polymyositis, or mixed connective tissue disease (MCTD); in a subject who has (has been diagnosed as having) sarcoidosis; in a subject who has experienced radiation/has been treated with radiation therapy; or in a subject who has experienced exposure to silica dust (silicosis) or asbestos; wherein said subject notably has (has been diagnosed as having) an interstitial lung disease.

27) In a particular embodiment of the present invention, said combination pharmaceutical compositions according to embodiments 1) to 26) are for use
in the prevention or treatment of abnormal accumulation of cells and/or fibronectin and/or collagen, and/or increased fibroblast recruitment in the lung, and/or
to prevent or treat the progression of/to slow the rate of structural alterations in the lung; wherein especially the subject to be treated has been diagnosed as having pulmonary fibrosis and/or pneumonia or interstitial lung disease as defined herein.

28) A second aspect of the invention relates to the compounds of formula (I) as defined in any one of embodiments 1) to 15), or a pharmaceutically acceptable salt thereof, for use in the prophylaxis/prevention or treatment of fibrotic diseases as defined herein, in particular pulmonary fibrosis (especially IPF); wherein said compound of formula (I) is (intended) to be administered/is administered in combination with one or more (notably one or two) therapeutically active ingredients acting as anti-fibrotic agent(s); wherein, in a sub-embodiment, said combination preferably is
a combination with pirfenidone, or a pharmaceutically acceptable salt thereof (especially pirfenidone in free form);
a combination with nintedanib, or a pharmaceutically acceptable salt thereof (such as especially the ethane-sulfonate); or
a combination with both pirfenidone, or a pharmaceutically acceptable salt thereof (especially pirfenidone in free from) and nintedanib, or a pharmaceutically acceptable salt thereof (such as especially the ethane-sulfonate);
or said combination is
a combination with a pirfenidone analog, or a pharmaceutically acceptable salt thereof; or
a combination with both a pirfenidone analog, or a pharmaceutically acceptable salt thereof, and nintedanib, or a pharmaceutically acceptable salt thereof (such as especially the ethane-sulfonate).

The compounds of formula (I) as defined in embodiments 1) to 15), when combined with one or more therapeutically active ingredients acting as anti-fibrotic agent(s) such as especially pirfenidone and/or nintedanib are useful for the prevention and/or treatment of fibrotic diseases as defined herein, in particular pulmonary fibrosis (especially IPF) (and diseases or disorders associated with such fibrotic diseases), and may in addition be of potential use for the prevention and/or treatment of other disorders mediated by $LPA_1$ receptor signalling.

29) A further embodiment relates to compounds of formula (I) as defined in any one of embodiments 1) to 15), or a pharmaceutically acceptable salt thereof, for use according to embodiment 28); wherein such use is for the prevention and/or treatment of
pulmonary fibrosis; notably pulmonary fibrosis selected from idiopathic pulmonary fibrosis; pulmonary fibrosis secondary to systemic inflammatory disease such as rheumatoid arthritis, scleroderma (systemic sclerosis), lupus (systemic lupus erythematosus), polymyositis, or mixed connective tissue disease (MCTD); pulmonary fibrosis secondary to sarcoidosis; iatrogenic pulmonary fibrosis including radiation-induced fibrosis; silicosis-induced pulmonary fibrosis; asbestos-induced pulmonary fibrosis; and pleural fibrosis; and, in addition to the above-listed, pulmonary fibrosis associated with COVID-19 (especially moderate or severe COVID-19)
renal fibrosis; notably renal fibrosis selected from renal fibrosis associated with CKD, chronic renal failure, tubulointerstitial nephritis, and/or chronic nephropathies such as (primary) glomerulonephritis and glomerulonephritis secondary to systemic inflammatory diseases such as lupus (SLE) or scleroderma (SSc), diabetes, focal segmental glomerular sclerosis, IgA nephropathy, hypertension, renal allograft, and Alport syndrome; or
liver fibrosis; notably liver fibrosis selected from cirrhosis, alcohol-induced liver fibrosis, nonalcoholic steatohepatitis, biliary duct injury, primary biliary cirrhosis (also known as primary biliary cholangitis), infection- or viral-induced liver fibrosis (e.g. chronic HCV infection), and autoimmune hepatitis.

30) A further embodiment relates to compounds of formula (I) as defined in any one of embodiments 1) to 15), or a pharmaceutically acceptable salt thereof, for use according to embodiment 28); wherein such use is for the prevention and/or treatment of pulmonary fibrosis, wherein notably said pulmonary fibrosis is idiopathic pulmonary fibrosis;

pulmonary fibrosis secondary to systemic inflammatory disease such as rheumatoid arthritis, scleroderma (systemic sclerosis), lupus (systemic lupus erythematosus), polymyositis, or mixed connective tissue disease (MCTD);

pulmonary fibrosis secondary to sarcoidosis;

iatrogenic pulmonary fibrosis including radiation-induced fibrosis;

silicosis-induced pulmonary fibrosis;

asbestos-induced pulmonary fibrosis; or pleural fibrosis; or, in addition to the above-listed, pulmonary fibrosis associated with COVID-19 (especially moderate or severe COVID-19).

31) A further embodiment relates to compounds of formula (I) as defined in any one of embodiments 1) to 15), or a pharmaceutically acceptable salt thereof, for use according to embodiment 28); wherein such use is for the prevention and/or treatment of idiopathic pulmonary fibrosis;

pulmonary fibrosis secondary to systemic inflammatory disease such as rheumatoid arthritis, scleroderma (systemic sclerosis), lupus (systemic lupus erythematosus), polymyositis, or mixed connective tissue disease (MCTD);

pulmonary fibrosis secondary to sarcoidosis;

radiation-induced fibrosis;

silicosis-induced pulmonary fibrosis; or asbestos-induced pulmonary fibrosis; or, in addition to the above-listed, pulmonary fibrosis associated with COVID-19 (especially moderate or severe COVID-19).

32) A further embodiment relates to compounds of formula (I) as defined in any one of embodiments 1) to 15), or a pharmaceutically acceptable salt thereof, for combination use according to any one of embodiments 28) to 31); wherein the characteristics defined in any one of embodiments 16) to 27) apply *mutatis mutandis* to such compound for combination use.

33) In particular such compound of formula (I) for combination use according to any one of embodiments 28) to 32), relates to such use wherein said compound of formula (I) is (intended) to be administered/is administered with one therapeutically active ingredient acting as anti-fibrotic agent which is pirfenidone, or a pharmaceutically acceptable salt thereof (especially pirfenidone in free form).

34) Such compound of formula (I) for combination use according to embodiment 33) notably relates to such use wherein said compound of formula (I) is (intended) to be administered/is administered with pirfenidone, wherein pirfenidone, or a pharmaceutically acceptable salt thereof, is administered in a pharmaceutical unit dosage form suitable for the oral administration of a total of about 2403 mg per day or below (for example a total of about 801 mg t.i.d or below) of pirfenidone.

35) Such compound of formula (I) for combination use according to embodiment 33) further relates to such use wherein said compound of formula (I) is (intended) to be administered/is administered with pirfenidone, wherein pirfenidone, or a pharmaceutically acceptable salt thereof, is administered in a dose which is a tolerated efficacious dose or lower than a tolerated efficacious dose of pirfenidone when given as a single therapy (e.g. as indicated in an approval letter for pirfenidone for a certain disease or disorder when given as a single therapy).

36) Such compound of formula (I) for combination use according to embodiment 33) further relates to such use wherein said compound of formula (I) is (intended) to be administered/is administered with pirfenidone, wherein pirfenidone, or a pharmaceutically acceptable salt thereof, is administered in a dose which is lower than a tolerated efficacious dose of pirfenidone when given as a single therapy (e.g. as indicated in an approval letter for pirfenidone for a certain disease or disorder when given as a single therapy); wherein such dose may be a total of 1602 mg/day or below (for example 534 mg three times daily); especially a total of 801 mg/day (for example 267 mg three times daily).

37) Such compound of formula (I) for combination use according to any one of embodiments 28) to 32), further relates to such use wherein said compound of formula (I) is (intended) to be administered/is administered with one therapeutically active ingredient acting as anti-fibrotic agent which is nintedanib, or a pharmaceutically acceptable salt thereof (such as especially the ethane-sulfonate).

38) Such compound of formula (I) for combination use according to embodiment 37) notably relates to such use wherein nintedanib, or a pharmaceutically acceptable salt thereof, is administered in a pharmaceutical unit dosage suitable for the oral administration of nintedanib, wherein nintedanib, or a pharmaceutically acceptable salt thereof, is comprised in a pharmaceutical unit dosage form suitable for the oral administration of a total of about a total of 200 mg per day or below (for example 100 mg b.i.d.or below), 300 mg per day or below (for example 150 mg b.i.d. or below), or 400 mg per day or below (for example 200 mg b.i.d. or below); of nintedanib.

39) Such compound of formula (I) for combination use according to embodiment 37) further relates to such use wherein nintedanib, or a pharmaceutically acceptable salt thereof, is administered in a dose which is a tolerated efficacious dose or lower than a tolerated efficacious dose of nintedanib when given as a single therapy (e.g. as indicated in an approval letter for nintedanib for a certain disease or disorder when given as a single therapy).

40) Such compound of formula (I) for combination use according to embodiment 37) further relates to such use wherein nintedanib, or a pharmaceutically acceptable salt thereof, is administered in a dose which is lower than a tolerated efficacious dose of nintedanib when given as a single therapy (e.g. as indicated in an approval letter for nintedanib for a certain disease or disorder when given as a single therapy); wherein such dose may be a total of 200 mg per day or below (for example 100 mg b.i.d.) of nintedanib.

41) Another particular aspect of the present invention relates to such compound of formula (I) for combination use according to embodiments 28) to 40), wherein said compound of formula (I) is for use in the prevention/prophylaxis of pulmonary fibrosis (especially IPF), wherein said prevention/prophylaxis of pulmonary fibrosis (especially IPF) comprises delaying the onset of pulmonary fibrosis (especially IPF) in a subject who has experienced a pneumonia or interstitial lung disease (ILD; alternatively diffuse parenchymal lung disease (DPLD))/has been diagnosed as having experienced a pneumonia or ILD; wherein especially such pneumonia or ILD is interstitial pneumonia, in particular usual interstitial pneumonia.

42) Another particular aspect of the present invention relates to such compound of formula (I) for combination use according to embodiments 28) to 41), wherein said compound of formula (I) is for use in the prevention/prophylaxis or treatment of pulmonary fibrosis, wherein
said prevention/prophylaxis of pulmonary fibrosis comprises delaying the onset of pulmonary fibrosis, and
said treatment of pulmonary fibrosis comprises slowing the rate of decline in pulmonary function;
wherein especially said prevention/prophylaxis or treatment of pulmonary fibrosis is performed in a subject who has (has been diagnosed as having) a systemic inflammatory disease such as rheumatoid arthritis, scleroderma (systemic sclerosis), lupus (systemic lupus erythematosus), polymyositis, or mixed connective tissue disease (MCTD); in a subject who has (has been diagnosed as having) sarcoidosis; in a subject who has experienced radiation/has been treated with radiation therapy; or in a subject who has experienced exposure to silica dust (silicosis) or asbestos; wherein said subject notably has (has been diagnosed as having) an interstitial lung disease.

It is understood that in the context of the present invention, slowing the rate of decline in pulmonary function may especially be expressed as slowing the rate of decline in forced vital capacity (FVC); e.g. versus standard care treatment, or versus placebo.

43) Another particular aspect of the present invention relates to such compound of formula (I) for combination use according to embodiments 28) to 41), wherein said compound of formula (I) is used
to prevent or treat abnormal accumulation of cells and/or fibronectin and/or collagen, and/or increased fibroblast recruitment in the lung, and/or
to prevent or treat the progression of/to slow the rate of structural alterations in the lung;
wherein especially the subject to be treated has been diagnosed as having pulmonary fibrosis and/or pneumonia or interstitial lung disease as defined herein.

Accordingly, the compound of formula (I) as defined in any one of embodiments 1) to 15), or a pharmaceutically acceptable salt thereof, according to this invention is for use in combination (or co-therapy) with said further pharmaceutically active ingredients as defined herein which have anti-fibrotic activity.

Definitions provided herein are intended to apply uniformly to any one of embodiments 1) to 43), and, *mutatis mutandis*, throughout the description and the claims unless an otherwise expressly set out definition provides a broader or narrower definition. It is well understood that a definition or preferred definition of a term defines and may replace the respective term independently of (and in combination with) any definition or preferred definition of any or all other terms as defined herein.

The term "therapeutically active ingredients acting as anti-fibrotic agent(s)" or "anti-fibrotic agent(s)" refers to any anti-fibrotic agent that has shown potential for therapeutic use (as tested in in vitro and/or in vivo models, especially in clinical trials) and/or is indicated for such therapeutic use; wherein such therapeutic use is for at least one fibrotic disease. Examples are especially pirfenidone, or a pharmaceutically acceptable salt thereof; and nintedanib, or a pharmaceutically acceptable salt thereof. In addition, further examples of anti-fibrotic agents are pirfenidone analogs (i.e. compounds of structural similarity to pirfenidone and acting essentially by a comparable/the same mode of action as pirfenidone). Particular pirfenidone analogs are deuterated pirfenidone analogs such as 1-phenyl-5-(trideuteromethyl) pyridin-2(1H)-one (SD-560); the compound 1-methyl-7-(1-methyl-1H-pyrazol-4-yl)-5-(4-(trifluoromethoxy)phenyl)-1, 5-dihydro-4H-imidazo[4,5-c]pyridin-4-one (AK-3280, CAS Reg. No. 1799412-33-1, WO2014/055548, WO2019/152863); and further compounds disclosed in WO2014/055548 such as 7-(4-fluorophenyl)-3-methyl-5-(4-(trifluoromethoxy)phenyl)-3,5-dihydro-4H-imidazo[4,5-c]pyridin-4-one, 3-ethyl-7-(1H-pyrazol-4-yl)-5-(4-(trifluoromethoxy) phenyl)-3,5-dihydro-4H-imidazo[4,5-c]pyridin-4-one, or 7-(1-isopropyl-1H-pyrazol-4-yl)-3-methyl-5-(4-(trifluoromethoxy)phenyl)-3,5-dihydro-4H-imidazo[4,5-c]pyridin-4-one; as well as the compounds disclosed in WO2015/153683/U.S. Pat. No. 10,233,195 [in particular compounds 712-714 and 716-738 disclosed therein, notably 1-(methyl-d3)-7-(1-(methyl-d3)-1H-pyrazol-4-yl)-5-(4-(trifluoromethoxy)phenyl)-1,5-dihydro-4H-imidazo[4,5-c]pyridin-4-one (compound 724)]. It is understood that pirfenidone analogs may, in addition, be used in combination with nintedanib.

In a sub-embodiment, the present invention, thus, relates to the compounds of formula (I) as defined in any one of embodiments 1) to 15), or a pharmaceutically acceptable salt thereof, for use in the prophylaxis/prevention or treatment of fibrotic diseases as defined herein, in particular pulmonary fibrosis (especially IPF); wherein said compound of formula (I) is (intended) to be administered/is administered in combination with a pirfenidone analog, such as especially 1-phenyl-5-(trideuteromethyl)pyridin-2(1H)-one; or 1-methyl-7-(1-methyl-1H-pyrazol-4-yl)-5-(4-(trifluoromethoxy) phenyl)-1,5-dihydro-4H-imidazo[4,5-c]pyridin-4-one, or a pharmaceutically acceptable salt (especially a tosylate) thereof; optionally additionally in combination with nintedanib, or a pharmaceutically acceptable salt (especially esylate) thereof.

The term "pirfenidone, or a pharmaceutically acceptable salt thereof" especially refers to pirfenidone in free form.

The term "nintedanib, or a pharmaceutically acceptable salt thereof" especially refers to nintedanib in free form or in pharmaceutically acceptable salt form, wherein a preferred pharmaceutically acceptable salt form is nintedanib ethanesulfonate (nintedanib esylate).

The terms "fibrotic disease" or, alternatively, "fibrosis" refer to conditions that are associated with the abnormal accumulation of cells and/or fibronectin and/or collagen and/or increased fibroblast recruitment in an organ; including fibrosis of individual organs or tissues such as the heart, kidney, liver, joints, lung, pleural tissue, peritoneal tissue, skin, cornea, retina, musculoskeletal and digestive tract.

The term fibrosis may in particular be defined as comprising
all forms of pulmonary fibrosis including all forms of fibrosing interstitial lung diseases, especially idiopathic pulmonary fibrosis (alternatively named cryptogenic fibrosing alveolitis); pulmonary fibrosis secondary to systemic inflammatory disease such as rheumatoid arthritis, scleroderma (systemic sclerosis), lupus (systemic lupus erythematosus), polymyositis, or mixed connective tissue disease (MCTD); pulmonary fibrosis secondary to sarcoidosis; iatrogenic pulmonary fibrosis including radiation-induced fibrosis; silicosis-induced pulmonary fibrosis; asbestos-induced pulmonary fibrosis; and pleural fibrosis; renal fibrosis; including renal fibrosis associated with CKD, chronic renal failure, tubulointerstitial nephritis, and/or chronic nephropathies such as (primary) glomerulonephritis and glomerulonephritis secondary to systemic inflammatory diseases such as lupus (SLE) or scleroderma (SSc), diabetes, focal segmental glomerular sclerosis, IgA nephropathy, hypertension, renal allograft, and Alport syndrome;

gut fibrosis, including gut fibrosis secondary to scleroderma, and radiation-induced gut fibrosis;

all forms of liver fibrosis, including cirrhosis, alcohol-induced liver fibrosis, nonalcoholic steatohepatitis, biliary duct injury, primary biliary cirrhosis (also known as primary biliary cholangitis), infection- or viral-induced liver fibrosis (e.g. chronic HCV infection), and autoimmune hepatitis;

head and neck fibrosis, including radiation-induced head and neck fibrosis;

corneal scarring, including sequelae of LASIK (laser-assisted in situ keratomileusis), corneal transplant, and trabeculectomy;

hypertrophic scarring and keloids, including burn-induced or surgical hypertrophic scarring and keloids;

and other fibrotic diseases, e.g. endometriosis, spinal cord fibrosis, myelofibrosis, cardiac fibrosis, perivascular fibrosis; as well as formation of scar tissue, Peyronie's disease, abdominal or bowel adhesions, bladder fibrosis, fibrosis of the nasal passages, and fibrosis mediated by fibroblasts.

In addition to the above-listed, the term fibrosis furthermore comprises all forms of fibrosis (especially pulmonary fibrosis, renal fibrosis or liver fibrosis, in particular pulmonary fibrosis) associated with SARS-CoV-2 infection and/or COVID-19 (especially moderate or severe COVID-19). The term "associated with" is to be understood that said fibrosis (especially pulmonary fibrosis, renal fibrosis or liver fibrosis, in particular pulmonary fibrosis) arises at the same time or after a diagnosed SARS-CoV-2 infection and/or COVID-19, wherein the actual cause of said fibrosis may be unclear/not diagnosed. It is understood that such fibrosis (especially pulmonary fibrosis, renal fibrosis or liver fibrosis, in particular pulmonary fibrosis) associated with such SARS-CoV-2 infection and/or COVID-19 (especially moderate or severe COVID-19) may be a sequela of said SARS-CoV-2 infection and/or COVID-19; and/or may be induced by (or caused by) said SARS-CoV-2 infection and/or COVID-19.

Likewise, the term pulmonary fibrosis, in addition to the above-listed forms of fibrosing interstitial lung diseases, especially comprises pulmonary fibrosis associated with SARS-CoV-2 infection and/or COVID-19 (especially moderate or severe COVID-19).

The term "prevention/prophylaxis of fibrosis" includes the prevention of fibrosis in a subject who has been exposed to one or more environmental conditions that are known to increase the risk of fibrosis of an organ or tissue, especially the risk of lung, liver or kidney fibrosis; or in a subject that has a genetic predisposition of developing fibrosis of an organ or tissue; as well as the prevention or minimization of scarring following injury including surgery.

The term "prevention/prophylaxis of pulmonary fibrosis" (wherein such pulmonary fibrosis is especially IPF) further includes delaying the onset of pulmonary fibrosis (especially IPF) in a patient who has experienced a pneumonia or interstitial lung disease (ILD; alternatively named diffuse parenchymal lung disease (DPLD))/has been diagnosed as having experienced a pneumonia or ILD; wherein especially such pneumonia or ILD is interstitial pneumonia, in particular usual interstitial pneumonia.

The term "treatment of pulmonary fibrosis" (wherein such pulmonary fibrosis is especially IPF) further includes slowing the rate of decline in pulmonary function in a patient who has experienced a pneumonia or interstitial lung disease (ILD; alternatively named diffuse parenchymal lung disease (DPLD))/has been diagnosed as having experienced a pneumonia or ILD; wherein especially such pneumonia or ILD is interstitial pneumonia, in particular usual interstitial pneumonia.

The term "prevention/prophylaxis of pulmonary fibrosis" further includes delaying the onset of pulmonary fibrosis, and the term "treatment of pulmonary fibrosis" further includes slowing the rate of decline in pulmonary function; wherein said prevention/prophylaxis or treatment is performed in a subject/patient who has (has been diagnosed as having) a systemic inflammatory disease such as rheumatoid arthritis, scleroderma (systemic sclerosis), lupus (systemic lupus erythematosus), polymyositis, or mixed connective tissue disease (MCTD); in a subject/patient who has (has been diagnosed as having) sarcoidosis; in a subject/patient who has experienced radiation/has been treated with radiation therapy; or in a subject/patient who has experienced exposure to silica dust (silicosis) or asbestos; wherein said subject/patient especially has/has been diagnosed as having an interstitial lung disease.

The term "systemic inflammatory disease" refers to systemic inflammatory and/or autoimmune diseases, such as especially rheumatoid arthritis, scleroderma (systemic sclerosis), lupus (systemic lupus erythematosus), polymyositis, and mixed connective tissue disease (MCTD).

The term "prevention/prophylaxis or treatment of pulmonary fibrosis" (wherein such pulmonary fibrosis is especially IPF) further includes prevention or treatment of abnormal accumulation of cells and/or fibronectin and/or collagen and/or increased fibroblast recruitment in the lung, and/or prevention or treatment of the progression of/slowing the rate of structural alterations in the lung; wherein especially the subject/patient to be treated has been diagnosed as having pulmonary fibrosis and/or pneumonia or interstitial lung disease.

Structural alterations in the lung are correlated to well-known histopathologic appearances such as septal thickening, honeycombing, nodular pattern, lung attenuation pattern, ground-glass opacity (GGO), etc., and may routinely be detected and quantified by using high-resolution computed tomography (HRCT) of the thorax.

The compounds of formula (I) as defined in any one of embodiments 1) to 15), when combined with pirfenidone and/or nintedanib may further be useful for the prevention and/or treatment of diseases and disorders mediated by $LPA_1$ receptor signalling, such diseases and disorders notably comprising dermatological disorders, pain, malignant and benign proliferative diseases, respiratory diseases, nervous system disorders, cardiovascular diseases, and inflammatory disorders, obesity, and insulin resistance.

The term "dermatological disorder," refers to a skin disorder. Such dermatological disorders include proliferative or inflammatory disorders of the skin such as systemic sclerosis, atopic dermatitis, bullous disorders, collagenosis, psoriasis, scleroderma, psoriatic lesions, dermatitis, contact dermatitis, eczema, urticaria, rosacea, wound healing, scarring, hypertrophic scarring, keloids, Kawasaki Disease, rosacea, Sjogren-Larsso syndrome, urticaria; especially systemic sclerosis.

The term "pain" refers to acute pain, chronic pain, and neuropathic pain. A particular example is fibromyalgia, especially fibromyalgia that stems from the formation of fibrous scar tissue in contractile muscles, and cancer pain.

The term "malignant and benign proliferative disease" especially refers to cancer, and the control of proliferation of tumor cells, invasion and/or metastasis of carcinomas.

The term "cancer," refers to all sorts of cancers such as carcinomas; adenocarcinomas; leukemias; sarcomas; lymphomas; myelomas; metastatic cancers; brain tumors; neuroblastomas; pancreatic cancers; gastro-intestinal cancers; lung cancers; breast cancers; prostate cancers; endometrial cancers; skin cancers; bladder cancers; head and neck cancers; neuroendocrine tumors; ovarian cancers; cervical cancers; oral tumors; nasopharyngeal tumors; thoracic cancers; and virally-induced tumors. Notably the term refers to pleural mesothelioma, peritoneal mesothelioma, and bone metastases, as well as brain tumors including brain metastases, malignant gliomas, glioblastoma multiforme, medulloblastoma, meningiomas; neuroblastoma; pancreatic cancer including pancreatic adenocarcinoma/pancreatic ductal adenocarcinoma; gastro-intestinal cancers including colon carcinoma, colorectal adenoma, colorectal adenocarcinoma, metastatic colorectal cancer, familial adenomatous polyposis (FAP), gastric cancer, gallbladder cancer, cholangiocarcinoma, hepatocellular carcinoma; Kaposi's sarcoma; leukemias including acute myeloid leukemia, adult T-cell leukemia; lymphomas including Burkitt's lymphoma, Hodgkin's lymphoma, MALT lymphoma, and primary intraocular B-Cell lymphoma; lung cancer including non-small cell lung cancer; breast cancer including triple negative breast carcinoma; rhabdomyosarcoma; prostate cancer including castrate-resistant prostate cancer; esophageal squamous cancer; (oral) squamous cell carcinoma; endometrial cancer; thyroid carcinoma including papillary thyroid carcinoma; metastatic cancers; lung metastasis; skin cancer including melanoma and metastatic melanoma; bladder cancer including urinary bladder cancer, urothelial cell carcinoma; multiple myelomas; osteosarcoma; head and neck cancer; and renal carcinomas including renal cell carcinoma renal clear cell carcinoma, metastatic renal cell carcinoma, metastatic renal clear cell carcinoma; as well as neuroendocrine tumors; ovarian cancer; cervical cancer; oral tumors; nasopharyngeal tumors; thoracic cancer; choriocarcinoma; Ewing's sarcoma; and virally-induced tumors.

The term "respiratory disease," refers to diseases affecting the organs that are involved in breathing, such as the nose, throat, larynx, eustachian tubes, trachea, bronchi, lungs, related muscles (e.g. diaphragm and intercostals), and nerves. Respiratory diseases include interstitial pneumonia, asthma referring to any disorder of the lungs characterized by variations in pulmonary gas flow associated with airway constriction of whatever cause (intrinsic, extrinsic, or both; allergic or non-allergic) including adult respiratory distress syndrome and allergic (extrinsic) asthma, non-allergic (intrinsic) asthma, acute severe asthma, chronic asthma, clinical asthma, nocturnal asthma, allergen-induced asthma, aspirin-sensitive asthma, exercise-induced asthma, isocapnic hyperventilation, child-onset asthma, adult-onset asthma, cough-variant asthma, occupational asthma, steroid-resistant asthma, seasonal asthma; rhinitis including seasonal allergic rhinitis, perennial allergic rhinitis; chronic obstructive pulmonary disease (COPD) including chronic bronchitis or emphysema; airway inflammation, sarcoidosis, cystic fibrosis, hypoxia, and acute lung injury and acute respiratory distress syndrome (ARDS) (including ARDS which is bacterial pneumonia-induced, trauma-induced, viral pneumonia-induced, ventilator-induced, non-pulmonary sepsis-induced, or aspiration-induced).

The term "nervous system disorder" refers to conditions that alter the structure or function of the brain, spinal cord or peripheral nervous system, including but not limited to Alzheimer's Disease, cerebral edema, multiple sclerosis, neuropathies, Parkinson's Disease, nervous system disorders resulting from blunt or surgical trauma (including post-surgical cognitive dysfunction and spinal cord or brain stem injury, and head injury), cerebral edema, migraine, as well as the neurological aspects of disorders such as degenerative disk disease and sciatica.

The term "cardiovascular disease," as used herein refers to diseases affecting the heart or blood vessels or both, including but not limited to: arrhythmia (atrial or ventricular or both); atherosclerosis and its sequelae; cerebral ischemia, stroke, angina; cardiac rhythm disturbances; myocardial ischemia; myocardial infarction; cardiac or vascular aneurysm including aortic aneurysm; retinal ischemia; reperfusion injury following ischemia of the brain, heart or other organ or tissue; restenosis; peripheral obstructive arteriopathy of a limb, an organ, or a tissue; endotoxic, surgical, or traumatic shock; hypertension, valvular heart disease, heart failure, abnormal blood pressure; shock; vasoconstriction (including that associated with migraines); vascular abnormality, thrombosis, insufficiency limited to a single organ or tissue.

The term "inflammatory disorder" include psoriasis, rheumatoid arthritis, vasculitis, inflammatory bowel disease, dermatitis, osteoarthritis, inflammatory muscle disease, vaginitis, interstitial cystitis, scleroderma, eczema, allogeneic or xenogeneic transplantation (organ, bone marrow, stem cells and other cells and tissues) graft rejection, graft-versus-host disease, mixed connective tissue disease, lupus erythematosus, type I diabetes, dermatomyositis, phlebitis, Sjogren's syndrome, granulomatosis with polyangiitis (GPA, Wegener's granulomatosis), thyroiditis (e.g., Hashimoto's and autoimmune thyroiditis), myasthenia gravis, autoimmune hemolytic anemia, chronic relapsing hepatitis, allergic conjunctivitis, atopic dermatitis, sinusitis, and inflammation mediated by neutrophils.

Further disorders in which $LPA_1$ receptor plays a role notably comprise prostate and bladder disorders such as benign prostatic hyperplasia, diseases linked to eosinophil and/or basophil and/or dendritic cell and/or neutrophil and/or monocyte and/or T-cell recruitment, cardiomyopathy, myocardial remodeling, vascular remodeling, vascular permeability disorders, renal diseases, renal papillary necrosis, renal failure, tumor growth, metabolic diseases, pruritus, ocular diseases, macular degeneration, endocrine disorders, hyperthyroidism, osteoporosis, diabetes-related disease (nephropathy, retinopathy).

The term "subject" refers to a mammal, especially a human.

A combined treatment (or co-therapy) may be effected simultaneously (in a fixed dose or in a non-fixed dose), separately, or over a period of time (especially simultaneously).

"Simultaneously", when referring to an administration type, means in the present application that the administration type concerned consists in the administration of two or more active ingredients and/or treatments at approximately the same time; wherein it is understood that a simultaneous administration will lead to exposure of the subject to the two or more active ingredients and/or treatments at the same time. When administered simultaneously, said two or more active ingredients may be administered in a fixed dose combination, or in a non-fixed dose combination, wherein such non-fixed combination may be a non-fixed dose combination equivalent to a fixed dose combination (e.g. by using two or more different pharmaceutical compositions to be administered by the same route of administration at approximately the same time), or a non-fixed dose combination using two or more different routes of administration or dosing regimens; wherein in each case said administration leads to essentially simultaneous exposure of the subject to the combined two or more active ingredients and/or treatments. An example of simultaneous administration of a non-fixed dose combination using two different pharmaceutical compositions to be administered by the same route of administration at approximately the same time is a non-fixed dose combination wherein the compound of formula (I) as defined in any one of embodiments 1) to 15) is administered b.i.d., and the respective anti-fibrotic agent(s) is/are administered b.i.d. Another example of simultaneous administration of a non-fixed dose combination using two different routes of administration is a non-fixed dose combination wherein the compound of formula (I) as defined in any one of embodiments 1) to 15) is administered once a day or b.i.d., and the respective anti-fibrotic agent(s) is/are administered t.i.d. Another example of simultaneous administration of a non-fixed dose combination using two different routes of administration is a non-fixed dose combination wherein the compound of formula (I) as defined in any one of embodiments 1) to 15) is administered once a day, and the respective anti-fibrotic agent(s) is/are administered b.i.d. When used in combination with pirfenidone and/or nintedanib; or with a pirfenidone analog and/or nintedanib; the compound of formula (I) as defined in any one of embodiments 1) to 15) would especially be used "simultaneously", especially simultaneously in a non-fixed dose combination.

"Fixed dose combination", when referring to an administration type, means in the present application that the administration type concerned consists in the administration of one single pharmaceutical composition comprising the two or more active ingredients, such as especially the pharmaceutical compositions of any one of embodiments 1) to 24).

"Separately", when referring to an administration type, means in the present application that the administration type concerned consists in the administration of two or more active ingredients and/or treatments at different points in time; wherein it is understood that a separate administration will lead to a treatment phase (e.g. at least 1 h, notably at least 6 h, especially at least 12 h) where the subject is exposed to the two or more active ingredients and/or treatments at the same time; but a separate administration may also lead to a treatment phase where for a certain period of time (e.g. at least 12 h, especially at least one day) the subject is exposed to only one of the two or more active ingredients and/or treatments. Separate administration especially refers to situations wherein at least one of the active ingredients and/or treatments is given with a periodicity substantially different from daily (such as once or twice or thrice daily) administration (e.g. wherein one active ingredient and/or treatment is given e.g. once or twice or thrice a day, and another is given e.g. every other day, or once a week or at even longer distances).

By administration "over a period of time" is meant in the present application the subsequent administration of two or more active ingredients and/or treatments at different times. The term in particular refers to an administration method according to which the entire administration of one of the active ingredients and/or treatments is completed before the administration of the other / the others begins. In this way it is possible to administer one of the active ingredients and/or treatments for several months before administering the other active ingredient(s) and/or treatment(s).

It is understood that any embodiment relating to a compound of formula (I) as defined in any one of embodiments 1) to 15), or a pharmaceutically acceptable salt thereof, for combination use in the treatment of fibrotic diseases as defined herein, wherein said compound of formula (I) is (intended) to be administered/is administered in combination with one or more anti-fibrotic agent(s), such as pirfenidone and/or nintedanib, or a pharmaceutically acceptable salt thereof, also relates

- to said anti-fibrotic agent, especially pirfenidone and/or nintedanib, or a pharmaceutically acceptable salt thereof, for use in the treatment of said fibrotic diseases; wherein said anti-fibrotic agent, especially pirfenidone and/or nintedanib is (intended) to be administered in combination with said compound of formula (I);
- to the use of said compound of formula (I), or of a pharmaceutically acceptable salt thereof, for the manufacture of a medicament/a pharmaceutical composition comprising said compound of formula (I), or a pharmaceutically acceptable salt thereof, and said anti-fibrotic agent, especially pirfenidone and/or nintedanib, or a pharmaceutically acceptable salt thereof, for use in the treatment of said fibrotic diseases;
- to the use of said compound of formula (I), or of a pharmaceutically acceptable salt thereof, for the manufacture of a medicament/pharmaceutical composition comprising, as active ingredient, said compound of formula (I), or a pharmaceutically acceptable salt thereof, for use in the treatment of said fibrotic diseases; wherein said medicament/pharmaceutical composition is (intended) to be used in combination with said anti-fibrotic agent, especially pirfenidone and/or nintedanib, or a pharmaceutically acceptable salt thereof;
- to the use of said anti-fibrotic agent, especially pirfenidone and/or nintedanib, or a pharmaceutically acceptable salt thereof, for the manufacture of a medicament/ pharmaceutical composition comprising, as active ingredient, said anti-fibrotic agent, especially pirfenidone and/or nintedanib, or a pharmaceutically acceptable salt thereof, for use in the treatment of said fibrotic diseases; wherein said medicament/pharmaceutical composition is (intended) to be used in combination with said compound of formula (I), or a pharmaceutically acceptable salt thereof;
- to the use of a pharmaceutical composition comprising said compound of formula (I), or a pharmaceutically acceptable salt thereof, and said anti-fibrotic agent, especially pirfenidone and/or nintedanib, or a pharmaceutically acceptable salt thereof, for the treatment of said fibrotic diseases;
- to a medicament for use in the prevention or treatment said fibrotic diseases, said medicament comprising said compound of formula (I), or a pharmaceutically acceptable salt thereof; wherein said medicament is (intended) to be administered in combination with said anti-fibrotic agent, especially pirfenidone and/or nintedanib, or a pharmaceutically acceptable salt thereof;
- to a method of preventing or treating said fibrotic diseases comprising administering to a subject (preferably a human) in need thereof an effective amount of said compound of formula (I), or a pharmaceutically acceptable salt thereof, wherein said compound of formula (I) is administered in combination with an effective amount of said anti-fibrotic agent, especially pirfenidone and/or nintedanib, or of a pharmaceutically acceptable salt thereof; wherein it is understood that said combined administration may be in a fixed-dose combination or in a non-fixed dose combination;
- to a method of preventing or treating said fibrotic diseases comprising administering to a subject in need thereof an effective amount of a pharmaceutical composition comprising said compound of formula (I), or a pharmaceutically acceptable salt thereof, and said anti-fibrotic agent, especially pirfenidone and/or nintedanib, or a pharmaceutically acceptable salt thereof; and to a method of preventing or treating said fibrotic diseases comprising administering to a subject (preferably a human) in need thereof an effective amount of said anti-fibrotic agent, especially pirfenidone and/or nintedanib, or of a pharmaceutically acceptable salt thereof, wherein said anti-fibrotic agent, especially pirfenidone and/or nintedanib is administered in combination with an effective amount of said compound of formula (I), or of a pharmaceutically acceptable salt thereof wherein it is understood that said combined administration may be in a fixed-dose combination or in a non-fixed dose combination.

Where the plural form is used for compounds, salts, pharmaceutical compositions, diseases and the like, this is intended to mean also a single compound, salt, or the like.

Any reference to compounds is to be understood as referring also to the salts (and especially the pharmaceutically acceptable salts) of such compounds, as appropriate and expedient.

The term "pharmaceutically acceptable salts" refers to salts that retain the desired biological activity of the subject compound and exhibit minimal undesired toxicological effects. Such salts include inorganic or organic acid and/or base addition salts depending on the presence of basic and/or acidic groups in the subject compound. For reference see for example "Handbook of Pharmaceutical Salts. Properties, Selection and Use.", P. Heinrich Stahl, Camille G. Wermuth (Eds.), Wiley-VCH, 2008; and "Pharmaceutical Salts and Co-crystals", Johan Wouters and Luc Quéré (Eds.), RSC Publishing, 2012.

Unless used regarding temperatures, the term "about" placed before a numerical value "X" refers in the current application to an interval extending from X minus 10% of X to X plus 10% of X, and preferably to an interval extending from X minus 5% of X to X plus 5% of X. In the particular case of temperatures, the term "about" placed before a temperature "Y" refers in the current application to an interval extending from the temperature Y minus 10° C. to Y plus 10° C., preferably to an interval extending from Y minus 5° C. to Y plus 5° C., notably to an interval extending from Y minus 3° C. to Y plus 3° C. Room temperature means a temperature of about 25° C. When in the current application the term n equivalent(s) is used wherein n is a number, it is meant and within the scope of the current application that n is referring to about the number n, preferably n is referring to the exact number n.

Whenever the word "between" or "to" is used to describe a numerical range, it is to be understood that the end points of the indicated range are explicitly included in the range. For example: if a temperature range is described to be between 40° C. and 80° C. (or 40° C. to 80° C.), this means that the end points 40° C. and 80° C. are included in the range; or if a variable is defined as being an integer between 1 and 4 (or 1 to 4), this means that the variable is the integer 1, 2, 3, or 4.

The term "essentially", is understood in the context of the present invention to mean especially that the respective amount/purity/time etc. is at least 90, especially at least 95, and notably at least 99 percent of the respective total. For example when used in the term "essentially simultaneous exposure" is understood to mean especially that the respective exposure results in simultaneous exposure of pharmaceutically effective amounts of all combination active ingredients during at least 90, especially at least 95, and notably at least 99 percent of the time, i.e. of the day in case chronic/steady state exposure to the pharmaceutically active ingredients is contemplated.

Particular embodiments of the invention are described in the following examples, which serve to illustrate the invention in more detail without limiting its scope in any way.

Experimental Part

All temperatures are stated in ° C. Commercially available starting materials were used as received without further purification. Unless otherwise specified, all reactions were carried out under an atmosphere of nitrogen or argon. Compounds were purified by flash chromatography on silica gel (Biotage), by prep TLC (TLC-plates from Merck, Silica gel 60 $F_{254}$) or by preparative HPLC. Compounds described in the invention are characterized by $^1$H-NMR (400 MHz or 500 MHz Bruker; chemical shifts are given in ppm relative to the solvent used; multiplicities: s=singlet, d=doublet, t=triplet, q=quadruplet, quint=quintuplet, hex=hexet, hept=heptet, m=multiplet, br=broad, coupling constants are given in Hz) and/or by LC-MS (retention time $t_R$ is given in min; molecular weight obtained for the mass spectrum is given in g/mol) using the conditions listed below.

LC-MS with Acidic Conditions

LCMS-1: Waters Acquity Binary, Solvent Manager, MS: Waters SQ Detector, DAD: Acquity UPLC PDA Detector, ELSD: Acquity UPLC ELSD. Columns: Acquity UPLC CSH C18 1.7 um 2.1×50 mm from Waters, thermostated in the Acquity UPLC Column Manager at 60° C. Eluents: A: H2O+0.05% formic acid; B: AcCN+0.045% FA. Method: Gradient: 2% B 98% B over 2.0 min. Flow: 1.0 mL/min. Detection: UV 214 nm and ELSD.

LCMS-2: Aligent 1100 series with mass spectrometry detection (MS: Finnigan single quadrupole). Column: Zorbax RRHD SB-Aq (1.8 um, 3.0×50 mm). Conditions: MeCN [eluent A]; water+0.04% TFA [eluent B]. Gradient: 95% B→5% B over 5 min (flow: 4.5 mL/min)

Preparative HPLC with Acidic Conditions

Prep-HPLC-1: Column: Waters XBridge C18 (10 um, 75×30 mm). Conditions: MeCN [eluent A]; water+0.5% formic acid [eluent B]. Gradient:95% B→5% B over 5 min (flow: 75 mL/min). Detection: UV/Vis+MS Prep-HPLC-2: Column: Waters Zorbax SB-Aq (5 um, 75×30 mm). Conditions: MeCN [eluent A]; water+0.5% formic acid [eluent B]. Gradient:95% B→5% B over 5 min (flow: 75 mL/min). Detection: UV/Vis+MS Preparative HPLC with Basic Conditions Prep-HPLC-3: Column: Waters XBridge C18 (10 um, 75×30 mm). Conditions: MeCN [eluent A]; water+0.5% NH$_4$OH [eluent B]. Gradient:90% B→5% B over 6.5 min (flow: 75 mL/min). Detection: UV/Vis+MS Abbreviations (as Used Herein):

AcOH acetic acid
aq. aqueous
b.i.d. (bis in die): twice daily
Boc tert-butoxycarbonyl
BSA bovine serum albumin
Bu butyl such as in tert.-Bu (=tertiary butyl)
DCM dichloromethane
DIPEA diisopropyl-ethylamine, Hünig's base, ethyl-di-isopropylamine
DMF dimethylformamide
DMSO dimethylsulfoxide
EDC N-(3-dimethylaminopropyl)-N'-ethyl-carbodiimide Et ethyl (such as in OEt: ethoxy)
EtOAc ethyl acetate
EtOH ethanol
Ex. example(s)
h hour(s)
HATU 1-[Bis(dimethylamino)methylene]-1H-1,2,3-triazolo[4,5-b]pyridinium 3-oxide hexafluorophosphate
HOBt 1-hydroxybenzotriazole
HPLC high performance liquid chromatography
iPr isopropyl
LC-MS liquid chromatography—mass spectrometry
LPA lysophosphatidic acid
$LPAR_1$ lysophosphatidic receptor 1
Me methyl (such as in OMe: methoxy)
MeCN acetonitrile
MeOH methanol
PBS phosphate-buffered saline
$Pd(OH)_2$/C palladium hydroxide in charcoal
prep. preparative
q.d. (quaque die): once daily
Ref Ex reference example
r.t. room temperature
sat. saturated
TEA triethylamine
TFA trifluoroacetic acid
THF tetrahydrofuran
t.i.d. (ter in die): three times a day
TLC thin layer chromatography
T3P propylphosphonic anhydride
$t_R$ retention time Preparation of Intermediates Intermediate 1.A:
6-chloro-4-methoxypyridin-3-amine A mixture of 2-chloro-4-methoxy-5-nitropyridine (440 mg, 2.33 mmol), ammonium chloride (624 mg, 11.7 mmol) and iron powder (526 mg, 11.7 mmol) in EtOH (12 mL) and water (1.2 mL) is heated at 80° C. for 2 days. The reaction mixture is cooled down, filtered through a Whatmann glass filter and evaporated. The residue is partitioned between EtOAc and an aq. sat. $NaHCO_3$ solution. The phases are separated. The aqueous phase is extracted with EtOAc and combined organic extracts are dried over $MgSO_4$, filtered and evaporated to give the title compound I-1.A as a brownish solid (253 mg, 72%). $^1$H NMR (400 MHz, DMSO D6) δ: 7.61 (s, 1H), 6.89 (s, 1H), 5.02 (s, 2H), 3.86 (s, 3H).

Intermediate 1.B:
6-chloro-4-isopropoxypyridin-3-amine

To a solution of 2-chloro-4-isopropoxy-5-nitropyridine (1 g, 4.62 mmol) in EtOAc (40 mL) are added platinum 1% and vanadium 2%, on activated carbon (50-70% wetted powder) (75 mg) and platinum 3% on activated carbon (25 mg). The reaction mixture is hydrogenated at r.t. for 5 days, then filtered though a Celite pad, dried over $MgSO_4$, filtered and evaporated to give the title compound I-1.6 as a yellow oil (0.87 g, quantitative yield). $^1$H NMR (400 MHz, DMSO D6) δ: 7.61 (s, 1H), 6.89 (s, 1H), 4.92 (s, 2H), 4.74 (hept, J=6.0 Hz, 1H), 1.29 (d, J=6.0 Hz, 6H).

Intermediate 1.C:
4-methoxy-6-methylpyridin-3-amine

To a solution of 2-chloro-4-methoxy-6-methyl-3-nitropyridine (190 mg, 0.92 mmol) in MeOH (10 mL) is added 10% palladium on carbon-50% wet (30 mg). The reaction mixture is hydrogenated at r.t. for 1 h, degassed with argon, then filtered though a Celite pad, dried over $MgSO_4$, filtered and evaporated. The crude material is crystallized in MeCN to give the title compound I-1.0 as an off-white solid (121 mg, 95% yield). $^1$H NMR (400 MHz, DMSO D6) δ: 7.76 (s, 1H), 7.30 (s, 1H), 5.82 (s, 2H), 4.03 (s, 3H).

Intermediate 1.D:
2-methoxy-6-methylpyridin-3-amine

Step 1. Methanol (256 uL, 6.39 mmol) is added drop wise into a stirred suspension of NaH (60% dispersion in oil, 256 mg, 6.39 mmol) in anhydrous THF (10 mL) at 0° C. and the resulting solution is stirred for 0.5 h. To this solution is added drop wise a solution of 2-fluoro-6-methyl-3-nitropyridine (1.0 g, 6.09 mmol) in anhydrous THF (5 mL). After complete addition the solution is stirred at 0° C. for 0.5 h, before being allowed to warm to ambient temperature. The reaction is stirred at ambient temperature for 18 h, quenched with water (30 mL) and the aqueous layer extracted with EtOAc (3×50 mL). The combined organic extracts are washed with brine (30 mL), dried over $MgSO_4$, filtered and concentrated in vacuo. 2-Methoxy-6-methyl-3-nitropyridine is obtained as a yellow oil (539 mg, 53% yield) after purification by prep-HPLC (Prep-HPLC-3). $^1$H NMR (400 MHz, DMSO D6) δ: 8.34 (d, J=8.1 Hz, 1H), 7.09 (d, J=8.1 Hz, 1H), 4.01 (s, 3H), 2.51 (s, 3H).

Step 2. To a degassed solution of 2-methoxy-6-methyl-3-nitropyridine (539 mg, 3.21 mmol) in methanol (10 mL) is added $Pd(OH)_2$/C (255 mg) followed by ammonium formate. The reaction mixture is stirred at 50° C. for 20 h and is then filtered over a Whatmann-Filter and evaporated. The residue is dissolved in EtOAc (30 mL) and the organic solution is washed with sat. $NaHCO_3$ sol. (15 mL) followed by brine (15 mL). The organic phase is dried over $MgSO_4$, filtered and evaporated to give 2-methoxy-6-methylpyridin-3-amine I-1.D as a yellow oil (199 mg, 45% yield). LCMS-2: $t_R$=0.38 min, $[M+1]^+$ 139.13; $^1$H NMR (400 MHz, DMSO D6) δ: 6.78 (d, J=7.5 Hz, 1H), 6.54 (d, J=7.5 Hz, 1H), 4.65 (s, 2H), 3.82 (s, 3H), 2.23 (s, 3H).

Intermediate 1.E:
2-isopropoxy-6-methylpyridin-3-amine 2-lsopropoxy-6-methylpyridin-3-amine I-1.E is synthesized using the methodology described for I-1.D starting from commercially available 2-fluoro-6-methyl-3-nitropyridine and isopropanol. $^1$H NMR (400 MHz, DMSO D6) δ: 6.77 (d, J=7.5 Hz, 1H), 6.49 (d, J=7.5 Hz, 1H), 5.22 (m, 1H), 4.53 (s, 2H), 2.21 (s, 3H), 1.27 (d, J=6.2 Hz, 6H).

Intermediate 1.F: 2-ethoxy-6-methylpyridin-3-amine

2-Ethoxy-6-methylpyridin-3-amine I-1.F is synthesized using the methodology described for I-1.D starting from commercially available 2-fluoro-6-methyl-3-nitropyridine and ethanol. $^1$H NMR (400 MHz, DMSO D6) δ: 6.78 (d, J=7.5 Hz, 1H), 6.52 (d, J=7.5 Hz, 1H), 4.59 (s, 2H), 4.28 (q, J=7.0 Hz, 2H), 2.22 (s, 3H), 1.31 (t, J=7.0 Hz, 3H).

Intermediate 1.G:
2-(difluoromethoxy)-6-methylpyridin-3-amine

Step 1. A suspension of 6-methyl-3-nitropyridin-2-ol (10 g, 61.6 mmol) and $Na_2SO_4$ (21.89 g, 15.4 mmol) in MeCN (250 mL) is heated up to 60° C. and 2,2-difluoro-2-(fluorosulfonyl)acetic acid (8.8 mL, 80 mmol) is added drop wise over 10 min. The reaction mixture is stirred for another hour and is then quenched with NaOH 3M (250 mL) and the acetonitrile is removed in vacuo. The remaining aqueous component is extracted with EtOAc (3×200 mL). The combined organic extracts are washed with water (50 mL) followed by brine (100 mL), dried over $MgSO_4$, filtered and concentrated in vacuo. The yellow oil is purified by column chromatography (Biotage, Heptane: EtOAc 1:0 to 1:1) to give 2-(difluoromethoxy)-6-methyl-3-nitropyridine as a yellow oil that crystallized upon standing (10.9 g, 85% yield). $^1$H NMR (400 MHz, DMSO D6) δ: 8.51 (d, J=8.2 Hz, 1H), 7.82 (t, J=71.3 Hz, 1H), 7.39 (d, J=8.2 Hz, 1H), 2.55 (s, 3H).

Step 2. To 2-(difluoromethoxy)-6-methyl-3-nitropyridine (4.65 g, 22.8 mmol) in degassed methanol (100 mL) is added 10% palladium on carbon-50% wet (350 mg) and the reaction is hydrogenated at atmospheric pressure for 18 h. The mixture is filtered through Celite pad. The pad is rinsed with THF (3×10 mL) and the organic solution is concentrated in vacuo to afford 2-(difluoromethoxy)-6-methylpyridin-3-amine I-1.G as a pale yellow oil that crystallized upon standing (4.1 g, 92% yield). LCMS-2: $t_R$=0.75 min, no mass; $^1$H NMR (400 MHz, $CDCl_3$) δ: 7.52 (t, J=73.5 Hz, 1H), 6.96 (d, J=7.8 Hz, 1H), 6.77 (d, J=7.8 Hz, 1H), 2.36 (s, 3H).

Intermediate 2: 1-benzhydryl-3-(2-bromophenyl) azetidine-3-carboxylic acid

Step 1. To a solution of commercially available 1-bromo-2-fluorobenzene (5 g, 28.6 mmol) in THF (60 mL) is added 1-benzhydrylazetidine-3-carbonitrile (10.6 g, 42.9 mmol) and KHMDS 95% (10.3 mL, 42.9 mmol). The reaction mixture is left stirring at r.t. overnight. The reaction mixture is then concentrated to an oil under vacuum, diluted with EtOAc (100 mL) and washed with water (2×50 mL). The organic phase is dried over $MgSO_4$ and concentrated under vacuum. The crude material is purified by prep. HPLC (Prep-HPLC-2 conditions) to afford 1-benzhydryl-3-(2-bromophenyl)azetidine-3-carbonitrile as a beige solid (7.64 g, 66% yield). $^1$H NMR (400 MHz, DMSO D6) δ: 7.70 (d, J=7.9 Hz, 1H), 7.47-7.42 (m, 6H), 7.36-7.31 (m, 5H), 7.25-7.21 (m, 2H), 4.56 (s, 1H), 3.98 (d, J=8.0 Hz, 2H), 3.49-3.42 (m, 2H).

Step 2. To a solution of 1-benzhydryl-3-(2-bromophenyl) azetidine-3-carbonitrile (7.2 g, 17.9 mmol) in ethanol (80 mL) is added NaOH 25% (40 mL). The reaction mixture is stirred at 80° C. for 3-4 days (reaction monitored by LCMS) and is then cooled down to 0° C. and acidified by aq. 2M HCl. The mixture is extracted with EtOAc (2×200 mL), dried over $MgSO_4$, filtered and evaporated. The crude material is purified by column chromatography (eluent: DCM/MeOH 9:1) to give 1-benzhydryl-3-(2-bromophenyl)azetidine-3-carboxylic acid I-2 as yellow foam (6.37 g, 84% yield). LCMS-2: $t_R$=0.83 min, $[M+1]^+$ 423.99; $^1$H NMR (400 MHz, DMSO D6) δ: 7.54 (d, J=7.8 Hz, 1H), 7.43-7.41 (m, 4H), 7.37 (d, J=4.2 Hz, 2H), 7.29 (t, J=7.3 Hz, 4H), 7.21-7.17 (m, 3H), 4.47 (s, 1H), 3.88 (d, J=7.8 Hz, 2H), 3.36 (d, J=7.7 Hz, 2H).

Intermediate 3: 1-benzhydryl-3-(2-bromophenyl)azetidine-3-carbonyl chloride

1-Benzhydryl-3-(2-bromophenyl)azetidine-3-carboxylic acid I-2 (538 mg, 1.38 mmol) is dissolved in DCM (10 mL). Three drops of DMF are added followed by thionyl chloride (0.5 mL, 6.9 mmol) and the reaction is stirred at 50° C. for 1 h (monitored by LCMS). The reaction mixture is then evaporated to give crude 1-benzhydryl-3-(2-bromophenyl) azetidine-3-carbonyl chloride I-3 as a wax (620 mg) that is used a such.

Intermediate 4: 1-(tert-butoxycarbonyl)-3-(2-isopropylphenyl)azetidine-3-carboxylic acid Step 1. To a solution of I-2 (5.0 g, 11.8 mmol) in MeOH (30 mL) is added conc. sulfuric acid (10 mL). The reaction mixture is stirred at 75° C. for 24 h and is then evaporated. The residue is dissolved in EtOAc (100 mL) and washed with sat. $NaHCO_3$. The phases are separated and the organic phase is washed with brine (50 mL), dried over $MgSO_4$, filtered and evaporated. The crude compound is purified by chromatography (CombiFlash Hept/EtOAc 9:1) to give methyl 1-benzhydryl-3-(2-bromophenyl)azetidine-3-carboxylate as yellow oil (4.12 g, 80% yield). $^1$H NMR (400 MHz, CDCl3) δ: 7.54 (dd, $J_1$=1.1 Hz, $J_2$=8.0 Hz, 1H), 7.49-7.41 (m, 4H), 7.38-7.32 (m, 1H), 7.32-7.26 (m, 5H), 7.24-7.19 (m, 2H), 7.17 (td, $J_1$=1.9 Hz, $J_2$=7.9 Hz, 1H), 4.43 (s, 1H), 4.08 (d, J=8.3 Hz, 2H), 3.74 (s, 3H), 3.51 (d, J=8.2 Hz, 2H).

Step 2. To a solution of methyl 1-benzhydryl-3-(2-bromophenyl)azetidine-3-carboxylate (4.12 g, 9.44 mmol) in dioxane (50 mL) is added isopropenyl boronic acid pinacolester (2.5 g, 14.2 mmol) followed by $K_2O_3$ (6.5 g) and water (25 mL). $Pd(PPh_3)_4$ (327 mg, 0.28 mmol) is then added and the reaction mixture is stirred at 80° C. for 15 h. Water is added at r.t. and the reaction mixture is extracted with EtOAc. The organic extract is dried over $MgSO_4$, filtered and evaporated. Crude product is purified by chromatography (Combiflash, Hept/EtOAc 9:1) to give methyl 1-benzhydryl-3-(2-(prop-1-en-2-yl)phenyl)azetidine-3-carboxylate as a yellow oil (3.64 g, 97% yield). $^1$H NMR (400 MHz, DMSO D6) δ: 7.40-7.38 (m, 4H), 7.30-7.23 (m, 7H), 7.21-7.17 (m, 2H), 7.12-7.10 (m, 1H), 5.06 (s, 1H), 4.59 (s, 1H), 4.42 (s, 1H), 3.82 (d, J=7.7 Hz, 2H), 3.66 (s, 3H), 3.21 (d, J=7.7 Hz, 2H), 1.92 (s, 3H).

Step 3. To a solution of methyl 1-benzhydryl-3-(2-(prop-1-en-2-yl)phenyl)azetidine-3-carboxylate (3.64 g, 9.16 mmol) in MeOH/THF 1:1 (20 mL) is added aq. 2M LiOH (10 mL). The reaction mixture is stirred at 50° C. for 2 days, then cooled to 5° C. and acidified to pH 4 with 2M HCl. The reaction mixture is extracted with EtOAc. The organic extract is dried over $MgSO_4$, filtered and evaporated to give 1-benzhydryl-3-(2-(prop-1-en-2-yl)phenyl)azetidine-3-carboxylic acid as a beige solid (3.35 g, 95% yield). $^1$H NMR (400 MHz, DMSO D6) δ: 7.39 (d, J=7.3 Hz, 4H), 7.28 (t, J=7.4 Hz, 4H), 7.23-7.17 (m, 5H), 7.11-7.09 (m, 1H), 5.06 (s, 1H), 4.71 (s, 1H), 4.39 (s, 1H), 3.82 (d, J=7.6 Hz, 2H), 3.14 (d, J=7.5 Hz, 2H), 1.95 (s, 3H).

Step 4. A mixture of 1-benzhydryl-3-(2-(prop-1-en-2-yl) phenyl)azetidine-3-carboxylic acid (3.35 g, 8.74 mmol), 25% HCl solution (18 mL) and $Pd(OH)_2$/C 20% (1.6 g) in MeOH (100 mL) is degassed and is then hydrogenated at 1 bar for 18 h (reaction monitored by LCMS). The reaction mixture is then degassed with argon and is filtered on Celite pad which is rinsed with MeOH. Volatiles are evaporated and the residue is crystallized in MeCN to give hydrochloride of 3-(2-isopropylphenyl)azetidine-3-carboxylic acid as a white solid (1.17 g, 61% yield). $^1$H NMR (400 MHz, DMSO D6) δ: 13.55 (s br, 1H), 9.40 (s br, 1H), 9.15 (s br, 1H), 7.39 (d, J=6.9 Hz, 1H), 7.34 (t, J=7.2 Hz, 1H), 7.24 (t, J=7.0 Hz, 1H), 7.18 (d, J=7.6 Hz, 1H), 4.57-4.54 (m, 2H), 4.39-4.35 (m, 2H), 1.13 (d, J=6.7 Hz, 6H).

Step 5. To a suspension of 3-(2-isopropylphenyl)azetidine-3-carboxylic acid hydrochloride (1.17 g, 4.57 mmol) in DCM (25 mL) is added DIPEA (5.9 mL, 34.4 mmol) followed by Boc$_2$O (1.1 g, 5.02 mmol). The mixture is stirred at r.t. for 24 h. 1N HCl is added at 5° C. in order to adjust the pH to 1, and the reaction mixture is extracted with DCM (4 times). The combined organic extracts are dried over MgSO$_4$, filtered and evaporated. The residue is purified by chromatography (CombiFlash Hept/EtOAc 1.5:1) to give 1-(tert-butoxycarbonyl)-3-(2-isopropylphenyl)azetidine-3-carboxylic acid I-4 as a white solid (0.85 g, 58% yield). $^1$H NMR (400 MHz, CDCl3) δ: 7.36-7.31 (m, 2H), 7.26-7.21 (m, 1H), 7.18 (d, J=7.0 Hz, 1H), 4.64 (d, J=8.5 Hz, 2H), 4.37 (d, J=8.5 Hz, 2H), 2.61-2.51 (m, 1H), 1.46 (s, 9H), 1.19 (d, J=6.7 Hz, 6H).

Reference Example 1: N-(6-fluoro-4-methoxypyridin-3-yl)-3-(2-isopropylphenyl)azetidine-3-carboxamide Step 1. To a solution of 1-(tert-butoxycarbonyl)-3-(2-isopropylphenyl)azetidine-3-carboxylic acid I-4 (110 mg, 0.34 mmol) and DMF (0.3 mL) in pyridine (3 mL) is added POCl$_3$ (47 uL, 0.52 mmol) drop wise over 35 min (complete conversion into its acyl chloride is monitored by LCMS with MeOH quench). Next, a solution of 6-fluoro-4-methoxypyridine-3-amine (50.5 mg, 0.34 mmol) in pyridine (1 mL) is added to the reaction mixture. After a few hours, the mixture is quenched with water, followed by NaHCO$_3$. The aqueous solution is then extracted with EtOAc twice. The combined organic extracts are dried over MgSO$_4$, filtered and evaporated. The crude product is purified by prep. HPLC (Prep-HPLC-3 conditions) to give tert-butyl 3-((6-fluoro-4-methoxypyridin-3-yl)carbamoyl)-3-(2-isopropylphenyl)azetidine-1-carboxylate (77 mg, 50% yield) as a pale yellow oil. LCMS-1: t$_R$=1.28 min, [M+1]$^+$ 444.20.

Step 2. To a tert-butyl 3-((6-fluoro-4-methoxypyridin-3-yl)carbamoyl)-3-(2-isopropylphenyl)azetidine-1-carboxylate (76 mg, 0.17 mmol) in dioxane (2 mL) is added HCl 4N in dioxane (0.5 mL). The reaction mixture is stirred at r.t. overnight. Volatiles are evaporated to give the hydrochloride of the title compound Ex 1 as a white solid (70 mg, quantitative yield). LCMS-1: t$_R$=0.58 min, [M+1]$^+$ 344.28. $^1$H NMR (400 MHz, DMSO D6) δ: 8.58 (s, 1H), 8.21 (s, 1H), 7.49-7.40 (m, 3H), 7.34 (t, J=7.3 Hz, 1H), 6.90 (s, 1H), 4.66 (d, J=10.4 Hz, 2H), 4.40 (d, J=10.4 Hz, 2H), 3.74 (s, 3H), 2.50-2.40 (m, 1H), 1.12 (d, J=6.5 Hz, 6H).

Reference Example 7: 3-(2-isopropylphenyl)-N-(2-methoxy-6-methylpyridin-3-yl)azetidine-3-carboxamide Step 1. To a solution of 2-methoxy-6-methylpyridin-3-amine I-1.D (191 mg, 1.38 mmol) in THF (10 mL) is added a suspension of NaH (60% dispersion in oil, 120 mg, 2.76 mmol). After stirring the mixture for 30 min, a suspension of benzhydryl-3-(2-bromophenyl)azetidine-3-carbonyl chloride I-3 (608 mg, 1.38 mmol) in THF (10 mL) is added drop wise and stirring is continued for 2 h (reaction monitored by LCMS). The reaction mixture is then diluted with DCM (50 mL) and is washed with water (20 mL). The organic phase is dried over MgSO$_4$, filtered and evaporated. The crude compound is crystallized in MeCN to give 1-benzhydryl-3-(2-bromophenyl)-N-(2-methoxy-6-methylpyridin-3-yl)azetidine-3-carboxamide as an off-white solid (278 mg, 37% yield). $^1$H NMR (400 MHz, DMSO D6) δ: 11.10 (s, 1H), 8.42 (d, J=7.9 Hz, 1H), 7.62-7.57 (m, 5H), 7.40-7.34 (m, 5H), 7.28-7.18 (m, 4H), 6.88 (d, J=7.9 Hz, 1H), 4.73 (s, 1H), 4.17 (s, 3H), 4.01 (d, J=7.0 Hz, 2H), 3.52 (d, J=7.3 Hz, 2H), 2.42 (s, 3H).

Step 2. 1-Benzhydryl-N-(2-methoxy-6-methylpyridin-3-yl)-3-(2-(prop-1-en-2-yl)phenyl)azetidine-3-carboxamide is prepared from 1-benzhydryl-3-(2-bromophenyl)-N-(2-methoxy-6-methylpyridin-3-yl)azetidine-3-carboxamide following the methodology described for I-4—step 2 (216 mg, 84% yield). $^1$H NMR (400 MHz, DMSO D6) δ: 11.24 (s, 1H), 8.44 (d, J=7.9 Hz, 1H), 7.57 (d, J=7.5 Hz, 4H), 7.36 (t, J=7.5 Hz, 4H), 7.26-7.15 (m, 5H), 7.00 (d, J=7.3 Hz, 1H), 6.88 (d, J=7.9 Hz, 1H), 4.98 (s, 1H), 4.74 (s, 1H), 4.68 (s, 1H), 4.16 (s, 3H), 3.87 (d, J=7.4 Hz, 2H), 3.33 (d, J=7.4 Hz, 2H), 2.42 (s, 3H), 1.94 (s, 3H).

Step 3. A mixture of 1-benzhydryl-N-(2-methoxy-6-methylpyridin-3-yl)-3-(2-(prop-1-en-2-yl)phenyl)azetidine-3-carboxamide (216 mg, 0.43 mmol), 25% HCl solution (4.5 mL) and Pd(OH)$_2$/C 20% wt. % (300 mg) in MeOH (25 mL) is degassed and is then hydrogenated at 1 bar for 18 h (reaction monitored by LCMS). The reaction mixture is then degassed with argon and is filtered on Celite pad which is rinsed with MeOH (10 mL). Volatiles are evaporated and the residue is dissolved in EtOAc (60 mL). The organic solution is washed with a solution of NaOH 5N aq. (30 mL), is dried over MgSO$_4$, filtered and evaporated. The crude material is purified by prep-TLC (eluent: DCM/MeOH 9/1) to give 3-(2-isopropylphenyl)-N-(2-methoxy-6-methylpyridin-3-yl)azetidine-3-carboxamide Ref Ex 7 as a white solid (32 mg, 22% yield). LCMS-1: t$_R$=0.68 min, [M+1]$^+$ 340.43; $^1$H NMR (400 MHz, CD$_3$OD) δ: 8.34 (d, J=7.9 Hz, 1H), 7.46-7.35 (m, 4H), 6.78 (d, J=7.9 Hz, 1H), 4.31 (d, J=8.5 Hz, 2H), 4.17 (d, J=8.5 Hz, 2H), 3.72 (s, 3H), 2.49 (m, 1H), 2.36 (s, 3H), 1.13 (d, J=6.7 Hz, 6H).

TABLE 1

Reference Examples 2 to 6
Ref Ex 2 to 6 are prepared in analogy to the methodology described for Ref Ex 1 using commercially available or synthesized pyridin-3-amine and intermediate I-4.

| Example | Name | Analytics LCMS-1 |
| --- | --- | --- |
| Ref Ex 2 | N-(6-chloro-4-methoxypyridin-3-yl)-3-(2-isopropylphenyl)azetidine-3-carboxamide | [M +1 ]$^+$ 360.24 t$_R$ 0.62 |
| Ref Ex 3 | N-(6-bromo-4-methoxypyridin-3-yl)-3-(2-isopropylphenyl)azetidine-3-carboxamide | [M + 1]$^+$ 404.22 and 406.22 t$_R$ 0.64 |
| Ref Ex 4 | N-(6-chloro-4-ethoxypyridin-3-yl)-3-(2-isopropylphenyl)azetidine-3-carboxamide | [M + 1]$^+$ 374.27 t$_R$ 0.69 |
| Ref Ex 5 | N-(6-chloro-4-isopropoxypyridin-3-yl)-3-(2-isopropylphenyl)azetidine-3-carboxamide | [M + 1]$^+$ 388.32 t$_R$ 0.73 |
| Ref Ex 6 | 3-(2-isopropylphenyl)-N-(4-methoxy-6-methylpyridin-3-yl)azetidine-3-carboxamide | [M + 1]$^+$ 340.29 t$_R$ 0.35 |

Reference Example 8: N-(2-isopropoxy-6-methylpyridin-3-yl)-3-(2-isopropylphenyl)azetidine-3-carboxamide N-(2-isopropoxy-6-methylpyridin-3-yl)-3-(2-isopropylphenyl)azetidine-3-carboxamide is prepared from 2-isopropoxy-6-methylpyridin-3-amine I-1.E (1.8 g) and benzhydryl-3-(2-bromophenyl)azetidine-3-carbonyl chloride I-3 (4.36 g) following the methodology described for Ref Ex 7 (1.29 g, white solid). LCMS-1: $t_R$=0.80 min, $[M+1]^+$ 368.34; $^1$H NMR (400 MHz, CD$_3$OD) δ: 8.45 (d, J=7.9 Hz, 1H), 7.49-7.47 (m, 2H), 7.43-7.40 (m, 2H), 6.74 (d, J=8.0 Hz, 1H), 5.51 (s, 1H), 5.18-5.11 (m, 1H), 4.38 (d, J=8.2 Hz, 2H), 4.21 (d, J=8.0 Hz, 2H), 2.37-2.44 (m, 1H), 2.33 (s, 3H), 1.13 (d, J=6.7 Hz, 7H), 1.02 (d, J=6.2 Hz, 6H).

Reference Example 9: N-(2-(difluoromethoxy)-6-methylpyridin-3-yl)-3-(2-isopropylphenyl)azetidine-3-carboxamide N-(2-(difluoromethoxy)-6-methylpyridin-3-yl)-3-(2-isopropylphenyl)azetidine-3-carboxamide is prepared from 2-(difluoromethoxy)-6-methylpyridin-3-amine I-1.G (229 mg) and benzhydryl-3-(2-bromophenyl)azetidine-3-carbonyl chloride I-3 (608 mg) following the methodology described for Ref Ex 7 (110 mg, yellow oil). LCMS-1: $t_R$=0.71 min, $[M+1]^+$ 376.22; $^1$H NMR (500 MHz, DMSO D6) δ: 9.90 (s, 1H), 8.24 (d, J=8.0 Hz, 1H), 7.63 (t, J=72.6 Hz, 1H), 7.33 (dd, $J_1$=1.3 Hz, $J_2$=7.8 Hz, 1H), 7.28 (td, $J_1$=1.2 Hz, $J_2$=7.3 Hz, 1H), 7.19 (m, $J_1$=1.4 Hz, $J_2$=7.7 Hz, 1H), 7.14 (dd, $J_1$=1.1 Hz, $J_2$=7.7 Hz, 1H), 7.11 (d, J=8.4 Hz, 1H), 4.07 (m, 2H), 4.01 (m, 2H), 2.38 (s, 3H), 1.09 (d, J=6.7 Hz, 6H).

Reference Example 10: N-(6-chloro-2-methoxypyridin-3-yl)-3-(2-isopropylphenyl)azetidine-3-carboxamide Step 1. To a solution of 1-4 (40 mg, 0.125 mmol), commercial 6-chloro-2-methoxypyridin-3-amine (25 mg, 0.15 mmol) and pyridine (70 uL, 0.07 mmol) in EtOAc (1 mL) is added T3P 50% sol. in EtOAc (300 uL, 0.5 mmol). The reaction mixture is stirred at 65° C. overnight. Water (5 mL) is then added and the reaction mixture is extracted with EtOAc (3×10 mL). The combined organic extracts are dried over MgSO$_4$, filtered and evaporated. The residue is purified by prep. HPLC (Prep-HPLC-1 conditions) to afford tert-butyl 3-((6-chloro-2-methoxypyridin-3-yl)carbamoyl)-3-(2-isopropylphenyl)azetidine-1-carboxylate as a yellow oil (54 mg, 62% yield). LCMS-2: $t_R$=1.22 min, $[M+1]^+$ 460.37. $^1$H NMR (400 MHz, CDCl$_3$) δ: 8.58 (d, J=8.2 Hz, 1H), 7.48-7.41 (m, 2H), 7.39-7.32 (m, 3H), 6.92 (d, J=8.2 Hz, 1H), 4.80-4.54 (m, 2H), 4.52-4.28 (m, 2H), 3.75 (s, 3H), 2.43 (m, 1H), 1.48 (s, 9H), 1.14 (d, J=6.6 Hz, 6H).

Step 2. tert-Butyl 3-((6-chloro-2-methoxypyridin-3-yl)carbamoyl)-3-(2-isopropylphenyl)azetidine-1-carboxylate is subjected to standard Boc deprotection conditions: To a solution of the Boc protected precursor (1.41 mmol) in DCM (20 mL) is added TFA (1.1 mL, 14.1 mmol) at 10° C. The reaction mixture is stirred at r.t. for 2 h (monitored by LCMS) and is then evaporated. The residue is purified by prep. HPLC (Prep-HPLC-3 conditions) to give Ref Ex 10 as colorless oil (30 mg, 75% yield). LCMS-1: $t_R$=0.72 min, $[M+1]^+$ 360.30. $^1$H NMR (400 MHz, CDCl$_3$) δ: 8.62 (d, J=8.2 Hz, 1H), 8.38 (s, 1H), 7.41-7.36 (m, 2H), 7.34-7.29 (m, 1H), 7.17 (d, J=7.7 Hz, 1H), 6.92 (d, J=8.2 Hz, 1H), 4.27 (s br, 4H), 3.85 (s, 3H), 2.51-2.41 (m, 1H), 1.14 (d, J=6.7 Hz, 6H).

Reference Example 11: N-(2-ethoxy-6-methylpyridin-3-yl)-3-(2-isopropylphenyl)azetidine-3-carboxamide N-(2-ethoxy-6-methylpyridin-3-yl)-3-(2-isopropylphenyl)azetidine-3-carboxamide is prepared from 2-ethoxy-6-methylpyridin-3-amine I-1.F in analogy to reference example 8.

Examples

TABLE 2

Reference Examples and Examples 2-1 to 2-11: Reductive Amination
A solution of the appropriate Ref Ex 1 to 11 (0.139 mmol) and the appropriate aldehyde (0.417 mmol) in dry MeOH (2 mL) is stirred under inert atmosphere for 2 h. Cyanoborohydride (43 mg, 0.695 mmol) is then added. The reaction mixture is stirred at 50° C. for 2 h (reaction monitored by LCMS) and is then quenched with water (2 mL). The mixture is diluted with MeCN (2 mL) and is purified by prep. HPLC (Prep-HPLC-2 conditions) to give the desired product. Reference Examples and Examples 2-1 to 2-11 are synthesized from the appropriate Ref Ex 1 to 11 by reductive amination. Functional groups, such as an acid, may be protected with an appropriate ester protecting group. For example, esters are saponified by 2N LiOH after the reductive amination step.

| Example | Name | Analytics LCMS-1 |
| --- | --- | --- |
| Ref Ex 2-1 | methyl 4-(3-((6-chloro-4-methoxypyridin-3-yl)carbamoyl)-3-(2-isopropylphenyl)azetidin-1-yl)-2,2-dimethylbutanoate | $[M + 1]^+$ 488.31 $t_R$ 0.77 |
| Ex 2-2 | 4-(3-((6-chloro-4-methoxypyridin-3-yl)carbamoyl)-3-(2-isopropylphenyl)azetidin-1-yl)-2,2-dimethylbutanoic acid | $[M + 1]^+$ 474.34 $t_R$ 0.71 |
| Ref Ex 2-3 | methyl 4-(3-((6-chloro-4-ethoxypyridin-3-yl)carbamoyl)-3-(2-isopropylphenyl)azetidin-1-yl)-2,2-dimethylbutanoate | $[M + 1]^+$ 502.37 $t_R$ 0.83 |
| Ex 2-4 | 4-(3-((6-chloro-4-ethoxypyridin-3-yl)carbamoyl)-3-(2-isopropylphenyl)azetidin-1-yl)-2,2-dimethylbutanoic acid | $[M + 1]^+$ 488.34 $t_R$ 0.77 |
| Ex 2-5 | 4-(3-((6-chloro-4-isopropoxypyridin-3-yl)carbamoyl)-3-(2-isopropylphenyl)azetidin-1-yl)-2,2-dimethylbutanoic acid | $[M + 1]^+$ 502.34 $t_R$ 0.82 |
| Ex 2-6 | 4-(3-((6-bromo-4-methoxypyridin-3-yl)carbamoyl)-3-(2-isopropylphenyl)azetidin-1-yl)-2,2-dimethylbutanoic acid | $[M + 1]^+$ 518.28 and 520.28 $t_R$ 0.73 |
| Ref Ex 2-7 | ethyl 5-(3-((6-chloro-4-methoxypyridin-3-yl)carbamoyl)-3-(2-isopropylphenyl)azetidin-1-yl)-2,2-dimethylpentanoate | $[M + 1]^+$ 516.36 $t_R$ 0.85 |
| Ex 2-8 | 5-(3-((6-chloro-4-methoxypyridin-3-yl)carbamoyl)-3-(2-isopropylphenyl)azetidin-1-yl)-2,2-dimethylpentanoic acid | $[M + 1]^+$ 488.36 $t_R$ 0.73 |
| Ref Ex-2-9 | ethyl 5-(3-((6-chloro-4-ethoxypyridin-3-yl)carbamoyl)-3-(2-isopropylphenyl)azetidin-1-yl)-2,2-dimethylpentanoate | $[M + 1]^+$ 530.42 $t_R$ 0.89 |

TABLE 2-continued

Reference Examples and Examples 2-1 to 2-11: Reductive Amination
A solution of the appropriate Ref Ex 1 to 11 (0.139 mmol) and the
appropriate aldehyde (0.417 mmol) in dry MeOH (2 mL) is stirred under
inert atmosphere for 2 h. Cyanoborohydride (43 mg, 0.695 mmol) is then added.
The reaction mixture is stirred at 50° C. for 2 h (reaction monitored by LCMS)
and is then quenched with water (2 mL). The mixture is diluted with MeCN (2 mL)
and is purified by prep. HPLC (Prep-HPLC-2 conditions) to give the desired product.
Reference Examples and Examples 2-1 to 2-11 are synthesized from the appropriate
Ref Ex 1 to 11 by reductive amination. Functional groups, such as an acid, may be
protected with an appropriate ester protecting group. For example, esters are
saponified by 2N LiOH after the reductive amination step.

| Example | Name | Analytics LCMS-1 |
|---|---|---|
| Ex 2-10 | 5-(3-((6-chloro-4-ethoxypyridin-3-yl)carbamoyl)-3-(2-isopropylphenyl)azetidin-1-yl)-2,2-dimethylpentanoic acid | $[M + 1]^+$ 502.36 $t_R$ 0.79 |
| Ex 2-11 | 4-(3-((2-(difluoromethoxy)-6-methylpyridin-3-yl)carbamoyl)-3-(2-isopropylphenyl)azetidin-1-yl)-2,2-dimethylbutanoic acid (COMPOUND B) | $[M +1]^+$ 490.01 $t_R$ 0.78 |

TABLE 3

Example 3-1: Alkylation
Step 1. A mixture of the appropriate amine precursor
Ref Ex 1 to 11, e.g. Ref Ex 3 hydrochloride (50 mg, 0.11 mmol),
the appropriate methyl (bromoalkyl)carboxylate (0.17 mmol) and
$CS_2CO_3$ (150 mg, 0.46 mmol) in MeCN (1 mL) is stirred at 50° C. for 18 h.
The reaction mixture is evaporated and the residue is purified by
prep-HPLC (Prep-HPLC-3 conditions) to give the desired ester.
Step 2. The ester (0.06 mmol) is dissolved in MeOH (2 mL)
and is treated with 2M LiOH (1 mL, 2.0 mmol). The solution
is stirred at r.t. overnight (reaction progress monitored by LCMS).
The reaction mixture is cooled down to 0° C. and slowly acidified
to pH 4 with a solution of 2N HCl. The aqueous solution is then extracted
with EtOAc twice. The combined organic extracts are dried over $MgSO_4$, filtered
and evaporated to give the hydrochloride salt of the desired product.

| Example | Name | Analytics LCMS-1 |
|---|---|---|
| Ex 3-1 | 5-(3-((2-(difluoromethoxy)-6-methylpyridin-3-yl)carbamoyl)-3-(2-isopropylphenyl)azetidin-1-yl)-2,2-dimethylpentanoic acid | $[M + 1]^+$ 504.42 $t_R$ 0.81 |

TABLE 4

Reference Examples and Examples 4-1 to 4-7: Amide Coupling
To a solution of the appropriate Ref Ex 1 to 11, e.g.
N-(6-chloro-4-methoxypyridin-3-yl)-3-(2-isopropylphenyl)
azetidine-3-carboxamide Ref Ex 2 (30 mg, 0.08 mmol) and
the appropriate acid (0.12 mmol) in DMF (2 mL), EDC (21 mg, 0.11 mmol),
HOBt (17 mg, 0.11 mmol) and DIPEA (43 uL, 0.25 mmol) are added.
The mixture is stirred at r.t. for 18 h before it is diluted with sat. aq. $NaHCO_3$
and extracted twice with EtOAc. The combined org. extracts are dried
over $MgSO_4$, filtered and concentrated. The crude product is purified by
prep. HPLC (Prep-HPLC-3 conditions) to give the desired product. Reference Examples
and Examples 4-1 to 4-7 are synthesized from the appropriate Ref Ex 1 to 11 by amide
coupling with an acylchloride or a carboxylic acid in the presence of EDC/HOBt,
HATU, or T3P and an organic base (for ex. DIPEA, or pyridine). Functional groups,
such as a carboxylic acid, may be protected with an appropriate ester protecting group.
For exemple esters are saponified by 2N LiOH after the reductive amination step.
Saponification. The appropriate ester (0.044 mmol) is dissolved in
MeOH/THF 1:1 (1 mL) and is treated with 2M LiOH (45 uL, 18.4 mmol).
The solution is stirred at r.t. for 2 h (reaction progress monitored by LCMS). The
reaction mixture is then diluted with water, acidified at 5° C. to pH 1
with 6N HCl and extracted twice with EtOAc. The combined organic extracts
are dried over $MgSO_4$, filtered and evaporated to give the desired product.

| Example | Name | Analytics LCMS-1 |
|---|---|---|
| Ref Ex 4-1 | methyl 4-(3-((6-chloro-4-methoxypyridin-3-yl)carbamoyl)-3-(2-isopropylphenyl)azetidin-1-yl)-2,2-dimethyl-4-oxobutanoate | $[M + 1]^+$ 502.33 $t_R$ 1.17 |
| Ex 4-2 | 4-(3-((6-chloro-4-methoxypyridin-3-yl)carbamoyl)-3-(2-isopropylphenyl)azetidin-1-yl)-2,2-dimethyl-4-oxobutanoic acid | $[M + 1]^+$ 488.34 $t_R$ 1.07 |

TABLE 4-continued

Reference Examples and Examples 4-1 to 4-7: Amide Coupling
To a solution of the appropriate Ref Ex 1 to 11, e.g.
N-(6-chloro-4-methoxypyridin-3-yl)-3-(2-isopropylphenyl)
azetidine-3-carboxamide Ref Ex 2 (30 mg, 0.08 mmol) and
the appropriate acid (0.12 mmol) in DMF (2 mL), EDC (21 mg, 0.11 mmol),
HOBt (17 mg, 0.11 mmol) and DIPEA (43 uL, 0.25 mmol) are added.
The mixture is stirred at r.t. for 18 h before it is diluted with sat. aq. NaHCO$_3$
and extracted twice with EtOAc. The combined org. extracts are dried
over MgSO$_4$, filtered and concentrated. The crude product is purified by
prep. HPLC (Prep-HPLC-3 conditions) to give the desired product. Reference Examples
and Examples 4-1 to 4-7 are synthesized from the appropriate Ref Ex 1 to 11 by amide
coupling with an acylchloride or a carboxylic acid in the presence of EDC/HOBt,
HATU, or T3P and an organic base (for ex. DIPEA, or pyridine). Functional groups,
such as a carboxylic acid, may be protected with an appropriate ester protecting group.
For exemple esters are saponified by 2N LiOH after the reductive amination step.
Saponification. The appropriate ester (0.044 mmol) is dissolved in
MeOH/THF 1:1 (1 mL) and is treated with 2M LiOH (45 uL, 18.4 mmol).
The solution is stirred at r.t. for 2 h (reaction progress monitored by LCMS). The
reaction mixture is then diluted with water, acidified at 5° C. to pH 1
with 6N HCl and extracted twice with EtOAc. The combined organic extracts
are dried over MgSO$_4$, filtered and evaporated to give the desired product.

| Example | Name | Analytics LCMS-1 |
|---|---|---|
| Ex 4-3 | 4-(3-((6-bromo-4-methoxypyridin-3-yl)carbamoyl)-3-(2-isopropylphenyl)azetidin-1-yl)-2,2-dimethyl-4-oxobutanoic acid | [M + 1]$^+$ 532.26 and 534.26 $t_R$ 1.09 |
| Ref Ex 4-4 | methyl 4-(3-((6-chloro-4-ethoxypyridin-3-yl)carbamoyl)-3-(2-isopropylphenyl)azetidin-1-yl)-2,2-dimethyl-4-oxobutanoate | [M + 1]$^+$ 516.36 $t_R$ 1.25 |
| Ex 4-5 | 4-(3-((6-chloro-4-ethoxypyridin-3-yl)carbamoyl)-3-(2-isopropylphenyl)azetidin-1-yl)-2,2-dimethyl-4-oxobutanoic acid | [M + 1]$^+$ 484.32 $t_R$ 1.15 |
| Ex 4-6 | 4-(3-((2-(difluoromethoxy)-6-methylpyridin-3-yl)carbamoyl)-3-(2-isopropylphenyl)azetidin-1-yl)-2,2-dimethyl-4-oxobutanoic acid (COMPOUND C) | [M + 1]$^+$ 504.19 $t_R$ 1.20 |
| Ex 4-7 | 5-(3-((2-(difluoromethoxy)-6-methylpyridin-3-yl)carbamoyl)-3-(2-isopropylphenyl)azetidin-1-yl)-2,2-dimethyl-5-oxopentanoic acid | [M + 1]$^+$ 518.07 $t_R$ 1.18 |

TABLE 5

Examples 5-1 to 5-10:
Example 5-1: N-(6-fluoro-4-methoxypyridin-3-yl)-3-
(2-isopropylphenyl)-1-sulfamoylazetidine-3-carboxamide
To a solution of Ref Ex 1 (35 mg, 0.09 mmol) and TEA (39 uL, 0.28 mmol) in
dioxane (1 mL) is added sulfamide (18 mg, 0.18 mmol). The reaction mixture is
stirred at 100° C. for 18 h and is then evaporated. The crude compound is purified
by prep. HPLC (Prep-HPLC-2 conditions) to give the title compound Ex 5-1
as a white solid (15 mg, 39% yield). LCMS-1: $t_R$ = 0.94 min, [M + 1]$^+$ 423.29.
$^1$H NMR (400 MHz, DMSO D6) δ: 8.69 (s, 1 H), 8.15 (s, 1 H), 7.42-7.32 (m, 3 H),
7.29-7.24 (m, 1 H), 7.05 (s, 2 H), 6.89 (s, 1 H), 4.41 (d, J = 7.6 Hz, 2 H),
4.14 (d, J = 7.6 Hz, 2H), 3.75 (s, 3 H), 2.75-2.64 (m, 1 H), 1.11 (d, J = 6.6 Hz, 6 H).
Examples 5-2 to 5-10
Examples 5-2 to 5-10 are synthesized starting from the appropriate
Ref Ex 1 to 11 in analogy to the methodology described for Ex 5-1.

| Example | Name | Analytics LCMS-1 |
|---|---|---|
| Ex 5-2 | N-(6-chloro-4-methoxypyridin-3-yl)-3-(2-isopropylphenyl)-1-sulfamoylazetidine-3-carboxamide (COMPOUND A) | [M + 1]$^+$ 439.29 $t_R$ 1.00 |
| Ex 5-3 | N-(6-chloro-4-ethoxypyridin-3-yl)-3-(2-isopropylphenyl)-1-sulfamoylazetidine-3-carboxamide | [M + 1]$^+$ 453.26 $t_R$ 1.08 |
| Ex 5-4 | N-(6-chloro-4-isopropoxypyridin-3-yl)-3-(2-isopropylphenyl)-1-sulfamoylazetidine-3-carboxamide | [M + 1]$^+$ 467.28 $t_R$ 1.13 |
| Ex 5-5 | N-(6-bromo-4-methoxypyridin-3-yl)-3-(2-isopropylphenyl)-1-sulfamoylazetidine-3-carboxamide | [M + 1]$^+$ 483.18 and 485.18 $t_R$ 1.03 |
| Ex 5-6 | 3-(2-isopropylphenyl)-N-(4-methoxy-6-methylpyridin-3-yl)-1-sulfamoylazetidine-3-carboxamide | [M + 1]$^+$ 419.31 $t_R$ 0.57 |
| Ex 5-7 | N-(2-(difluoromethoxy)-6-methylpyridin-3-yl)-3-(2-isopropylphenyl)-1-sulfamoylazetidine-3-carboxamide | [M + 1]$^+$ 455.39 $t_R$ 1.14 |
| Ex 5-8 | 3-(2-isopropylphenyl)-N-(2-methoxy-6-methylpyridin-3-yl)-1-sulfamoylazetidine-3-carboxamide | [M + 1]$^+$ 419.05 $t_R$ 1.13 |
| Ex 5-9 | N-(2-ethoxy-6-methylpyridin-3-yl)-3-(2-isopropylphenyl)-1-sulfamoylazetidine-3-carboxamide | [M + 1]$^+$ 433.34 $t_R$ 1.21 |

TABLE 5-continued

Examples 5-1 to 5-10:
Example 5-1: N-(6-fluoro-4-methoxypyridin-3-yl)-3-
(2-isopropylphenyl)-1-sulfamoylazetidine-3-carboxamide
To a solution of Ref Ex 1 (35 mg, 0.09 mmol) and TEA (39 uL, 0.28 mmol) in
dioxane (1 mL) is added sulfamide (18 mg, 0.18 mmol). The reaction mixture is
stirred at 100° C. for 18 h and is then evaporated. The crude compound is purified
by prep. HPLC (Prep-HPLC-2 conditions) to give the title compound Ex 5-1
as a white solid (15 mg, 39% yield). LCMS-1: $t_R$ = 0.94 min, [M + 1]$^+$ 423.29.
$^1$H NMR (400 MHz, DMSO D6) δ: 8.69 (s, 1 H), 8.15 (s, 1 H), 7.42-7.32 (m, 3 H),
7.29-7.24 (m, 1 H), 7.05 (s, 2 H), 6.89 (s, 1 H), 4.41 (d, J = 7.6 Hz, 2 H),
4.14 (d, J = 7.6 Hz, 2H), 3.75 (s, 3 H), 2.75-2.64 (m, 1 H), 1.11 (d, J = 6.6 Hz, 6 H).
Examples 5-2 to 5-10
Examples 5-2 to 5-10 are synthesized starting from the appropriate
Ref Ex 1 to 11 in analogy to the methodology described for Ex 5-1.

| Example | Name | Analytics LCMS-1 |
| --- | --- | --- |
| Ex 5-10 | N-(2-isopropoxy-6-methylpyridin-3-yl)-3-(2-isopropylphenyl)-1-sulfamoylazetidine-3-carboxamide | [M + 1]$^+$ 447.14 $t_R$ 1.28 |

Biological Assays

Beta-Arrestin Recruitment Assay to Determine IC$_{50}$ values for human LPAR$_1$ The Tango™ EDG2-bla U2OS cells are obtained from Invitrogen. These cells contain the human LPA$_1$ receptor cDNA linked to a TEV protease site and a Gal4-VP16 transcription factor integrated into the Tango™ GPCR-bla U2OS parental cell line. This parental cell line stably expresses a beta-arrestin/TEV protease fusion protein and the beta-lactamase (bla) reporter gene under the control of a UAS response element. Upon LPA (agonist) binding, LPA$_1$ receptor gets activated, leading to arrestin-protease recruitment and proteolytic release of the transcription factor: The transcription factor then regulates transcription of a beta-lactamase reporter construct, which is measured upon addition of the live-cell substrate.

10'000 Tango™ EDG2-bla U2OS cells are seeded in a 384-well black with clear bottom plate in 30 µl Freestyle 293 Expression Medium (Invitrogen) and incubated for 20 h at 37° C., 5% CO$_2$. For antagonist assays, 5 µl of test compound (dilution series in DMSO/Freestyle 293 Expression medium/0.1% fatty acid free BSA (Sigma)) or buffer control are added per well and incubated for 30 min at 37° C., 5% CO$_2$. 5 µl of LPA 18:1 (500 nM final) (solution in Freestyle 293 Expression medium/0.1% fatty acid free BSA (Sigma)) are added per well and the plate incubated for 16 h at 37° C., 5% CO$_2$. Cells are then loaded with LiveBLAzer-FRET™ B/G Substrate (Invitrogen) for 2 h in the dark and the fluorescence emission at 460 nm and 530 nm is measured using the SynergyMx reader (BioTek). Following the background subtraction from both channels, the 460/530 nm emission ratio for each well is calculated, then plotted and fitted to a 4-parameter logistic function to obtain IC$_{50}$ values. IC$_{50}$ is the concentration of antagonist inhibiting 50% of the maximal response.

Antagonistic activities (IC$_{50}$ values) of exemplified compounds have been measured and antagonistic activities are displayed in Table 6. Where multiple values were measured, geomean values are given.

TABLE 6

| | IC$_{50}$ |
| --- | --- |
| Example | IC$_{50}$ LPAR$_1$ [nM] |
| 2-2 | 27 |
| 2-4 | 20 |
| 2-5 | 16 |
| 2-6 | 56 |
| 2-8 | 47 |
| 2-10 | 21 |
| 2-11 | 7 |
| 3-1 | 13 |
| 4-2 | 79 |
| 4-3 | 21 |
| 4-5 | 12 |
| 4-6 | 6 |
| 4-7 | 19 |
| 5-1 | 19 |
| 5-2 | 3 |
| 5-3 | 3 |
| 5-4 | 1 |
| 5-5 | 2 |
| 5-6 | 37 |
| 5-7 | 2 |
| 5-8 | 51 |
| 5-9 | 31 |
| 5-10 | 14 |

Assessment of in VIVO POTENCY

The in vivo potency of the compounds of Formula (I) can be determined using a mouse LPA-induced skin vascular leakage model. Female Balb/c mice are treated with either vehicle or test compound (p.o.) for at least 1 h prior to administration of the albumin marker Evans blue (50 mg/kg, i.v., 0.9% NaCl) and subsequent challenge with LPA (5 µg, i.d.). After 30 minutes, mice are sacrificed by CO$_2$ inhalation. Discs of skin from the injection sites are removed, digested in formamide (500 µl, 37° C., 24 hrs) and the content of Evans blue quantified by colorimetric assay. Results are expressed as extravasated Evans blue per skin disc (µg/disc).

As an example, selected compound of the present invention, Ex 5-2, is able to effectively reduce LPA-induced vascular leakage after oral administration of 30 mg/kg to mice as compared to a group of animals treated with vehicle only. Reduction of vascular leakage compared to vehicle group was ≥60%.

Example of Anti-Fibrotic Effect of Compounds of Formula (I) in Combination with Pirfenidone The anti-fibrotic effect of the respective Example COMPOUND A-C or Reference COMPOUND D (BMS-986020) and pirfenidone alone or in combination can be determined in vitro in the assay of TGFβ-induced myofibroblast differentiation.

Combination Efficacy Experiment: Transforming Growth Factor Beta (TGFβ)-Induced α-Smooth Muscle Actin (αSMA) Expression in Human Fibroblasts:

Normal Human Lung Fibroblasts (NHLF) were obtained from Lonza. 10'000 cells were seeded in 24-well plates in 300 μl Fibroblast Growth Medium-2 (FGM™-2, Lonza) and incubated for 20 hours at 37° C., 5% $CO_2$. The medium was changed for 300 μl Fibroblast Basal Medium (FBM™, Lonza) supplemented with 0.1% fatty acid free BSA (Sigma) and the plate incubated for 20 hours at 37° C., 5% $CO_2$. 100 μl of COMPOUND, pirfenidone or their combination (solution in FBM™/0.1% fatty acid free BSA) were added per well and incubated for 30 minutes, followed by addition of 100 μl of TGFβ (5 ng/ml final) (solution in FBM™/0.1% fatty acid free BSA) and incubation for 48 h at 37° C., 5% $CO_2$. The cells were washed with ice cold PBS and lysed in RIPA buffer (Sigma) supplemented with NaF, Na-orthovanadate, phenylmethylsulfonylfluorid (PMSF), dithiothreitol (DTT) and benzonase. Samples were resolved by SDS-PAGE on 4-12% Novex Bis-Tris precast gels (Thermo Fischer Scientific) and analyzed by western blot using αSMA (Sigma) and HRP-coupled secondary antibodies. Membranes were treated with Western Lighting Enhanced Chemiluminescence Substrate (Perkin Elmer) and the chemiluminescence signal was recorded by the reader Fusion FX6 (Viber Lourmat). Signals were quantified using densitometric analysis in Fusion software. % of inhibition of TGFβ-induced αSMA expression was calculated for each COMPOUND, pirfenidone and their combination. Additive effect was calculated by adding the values of % of inhibition by COMPOUND alone and pirfenidone alone and expressed as "expected combo inhibition". Measured % of inhibition by COMPOUND and pirfenidone combination was expressed as "measured combo inhibition". Pirfenidone potency was determined with the GraphPad Prism software using the following settings: minimum defined by the vehicle control without TGFβ stimulation, maximum defined by the response of TGFβ in absence or presence of COMPOUND, no weighting, and variable slope.

The results from the combination efficacy experiments are shown in FIG. 1 to 4 and FIG. 5.

FIGS. 1 to 4: 10 nM COMPOUNDS A-D, respectively, and 2 mM pirfenidone minimally inhibited TGFβ-induced αSMA expression in NHLF. When either of the COMPOUNDS A-D was combined with pirfenidone, the combination showed synergistic effect, strongly reducing αSMA expression.

Figure 5:
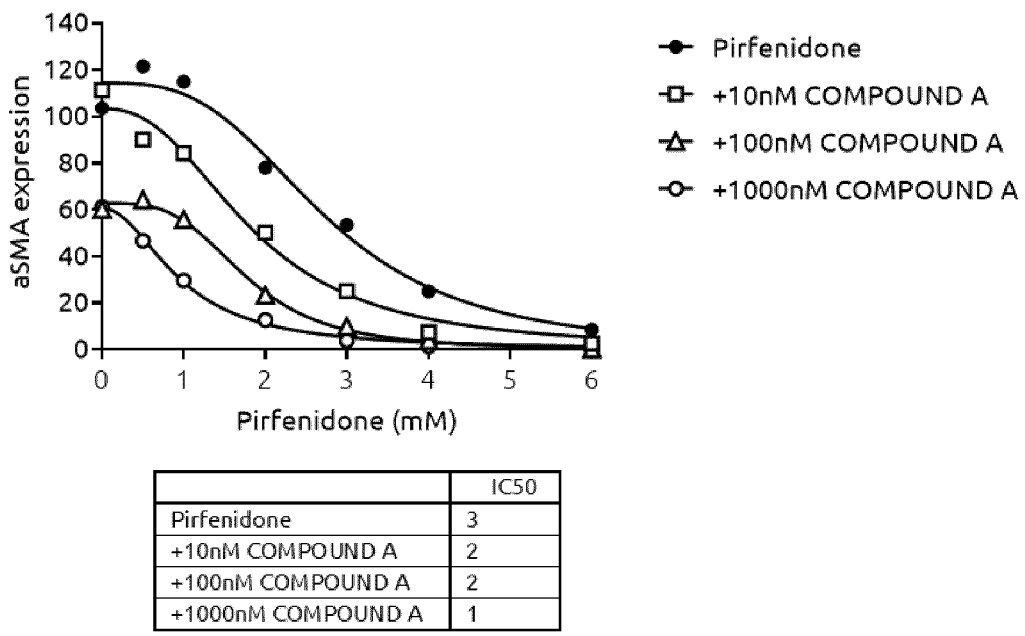
FIG. 5 shows the dose-response of pirfenidone on TGFβ-induced αSMA expression in NHLF in absence of COMPOUND A, and in presence of 10 nM, 100 nM and 1000 nM of COMPOUND A.

FIG. 5 shows dose-response of pirfenidone on TGFβ-induced αSMA expression in NHLF in absence, and presence of 10 nM, 100 nM and 1000 nM of COMPOUND A. Pirfenidone gains in potency when combined with COMPOUND A, as indicated by the decrease of its $IC_{50}$ (mM).

Example of Anti-Fibrotic Effect of Compounds of Formula (I) in Combination with Nintedanib The anti-fibrotic effect of the respective Example COMPOUND A-C and nintedanib alone or in combination can be determined in vitro in the assay of TGFβ-induced myofibroblast differentiation.

Combination Efficacy Experiment: TGFβ-Induced αSMA Expression in Human Fibroblasts:

NHLF were obtained from Lonza. 10'000 cells were seeded in 24-well plates in 300 μl FGM™ and incubated for 20 hours at 37° C., 5% $CO_2$. The medium was changed for 300 μl FBM™ supplemented with 0.1% fatty acid free BSA (Sigma) and the plate incubated for 20 hours at 37° C., 5% $CO_2$. 100 μl of the respective COMPOUND, nintedanib or their combination (solution in FBM™/0.1% fatty acid free BSA) were added per well and incubated for 30 minutes, followed by addition of 100 μl of TGFβ (5 ng/ml final) (solution in FBM™/0.1% fatty acid free BSA) and incubation for 48 h at 37° C., 5% $CO_2$. The cells were washed with ice cold PBS and lysed in RIPA buffer (Sigma) supplemented with NaF, Na-orthovanadate, phenylmethylsulfonylfluorid (PMSF), dithiothreitol (DTT). Samples were resolved by SDS-PAGE on 4-12% Novex Bis-Tris precast gels (Thermo Fischer Scientific) and analyzed by western blot using αSMA (Sigma) and HRP-coupled secondary antibodies.

Membranes were treated with Western Lighting Enhanced Chemiluminescence Substrate (Perkin Elmer) and the chemiluminescence signal was recorded by the reader Fusion FX6 (Viber Lourmat). Signals were quantified using densitometric analysis in Fusion software. % of inhibition of TGFβ-induced αSMA expression was calculated for each COMPOUND, nintedanib and their combination. Additive effect was calculated by adding the values of % of inhibition by COMPOUND alone and nintedanib alone and expressed as "expected combo inhibition". Measured % of inhibition by COMPOUND and nintedanib combination was expressed as "measured combo inhibition".

Figure 6:
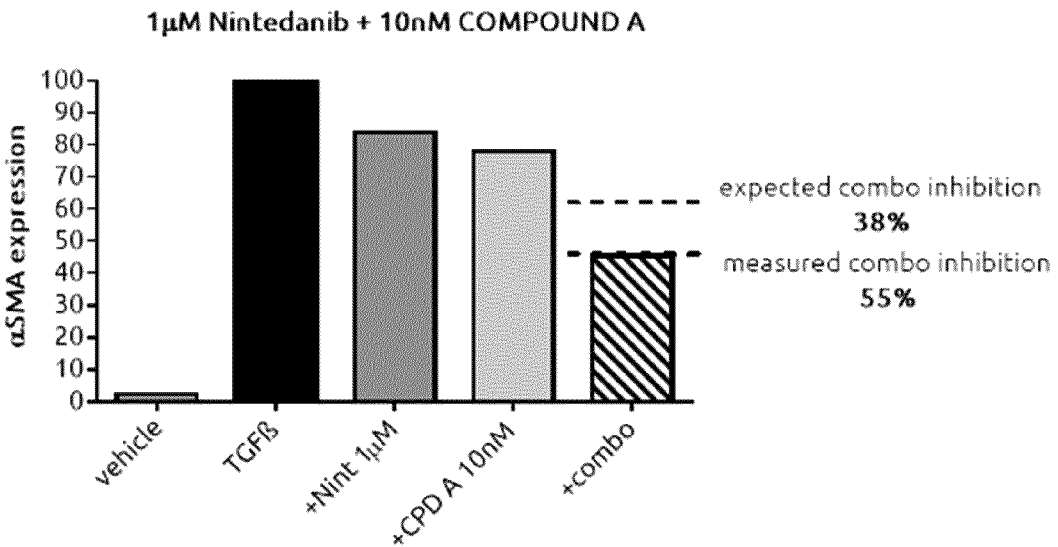
FIG. 6 shows the effect of COMPOUND A, nintedanib, and their combination on TGFβ-induced αSMA expression in human fibroblasts.
Figure 7:
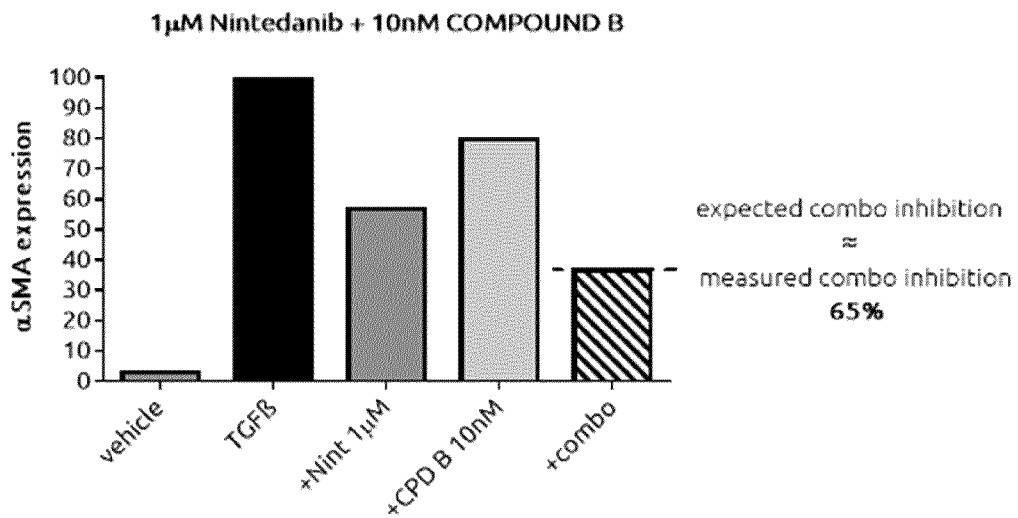
FIG. 7 shows the effect of COMPOUND B, nintedanib, and their combination on TGFβ-induced αSMA expression in human fibroblasts.
Figure 8:
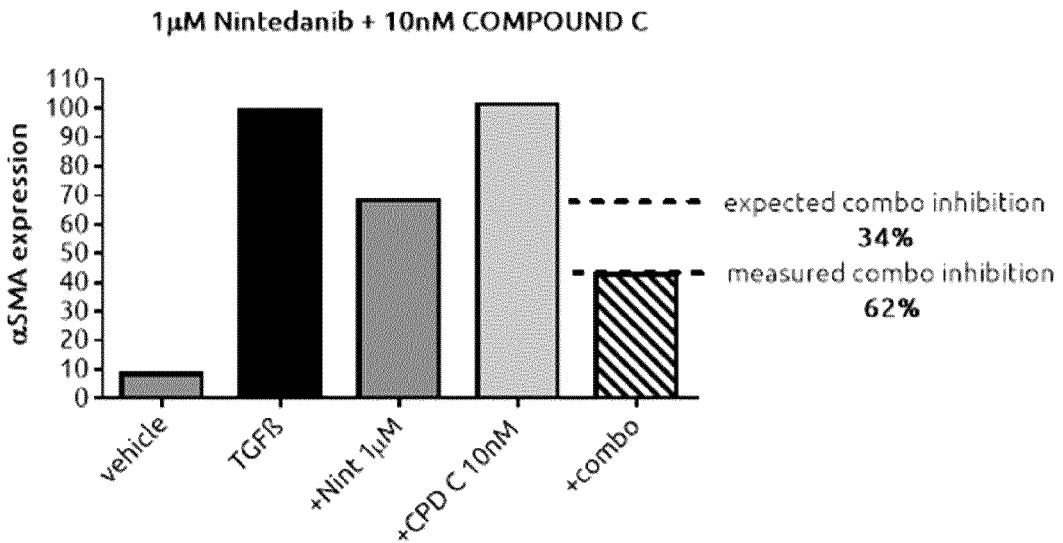
FIG. 8 shows the effect of COMPOUND C, nintedanib, and their combination on TGFβ-induced αSMA expression in human fibroblasts.

The results from the combination efficacy experiments are shown in FIG. 6 to 8.

FIGS. 6 to 8: 10 nM COMPOUNDS A-C, respectively, and 1 μM nintedanib minimally inhibited TGFβ-induced αSMA expression in NHLF. When either of the COMPOUNDS A-C was combined with nintedanib, the combination showed at least additive effect, strongly reducing αSMA expression.

The invention claimed is:

1. A method for prophylaxis or treatment of a fibrotic disease in a subject in need thereof, wherein the method comprises administering to the subject a compound of Formula (I):

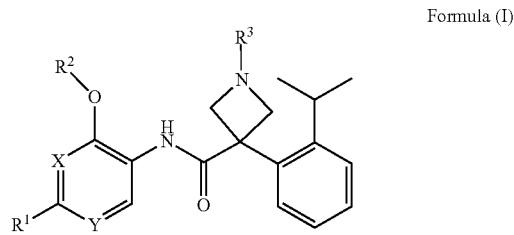

Formula (I)

wherein
X is CH; Y is N; and $R^2$ is methyl, ethyl, or isopropyl; or
X is N; Y is CH; and $R^2$ is methyl, ethyl, or isopropyl, or difluoromethyl;
$R^1$ is fluoro, chloro, bromo, or methyl; and
$R^3$ represents
—$(CH_2)_{2-3}$—$C(CH_3)_2$—COOH;
—CO—$(CH_2)_{1-2}$—$C(CH_3)_2$—COOH; or
—$SO_2$—$NH_2$;
or a pharmaceutically acceptable salt thereof;

wherein said compound of formula (I) is administered in combination with:
pirfenidone, or a pharmaceutically acceptable salt thereof;
nintedanib, or a pharmaceutically acceptable salt thereof; or
both pirfenidone, or a pharmaceutically acceptable salt thereof, and nintedanib, or a pharmaceutically acceptable salt thereof.

2. The method according to claim 1, wherein X is CH; Y is N; and $R^2$ is methyl, ethyl, or isopropyl.

3. The method according to claim 2, wherein $R^1$ is fluoro, chloro, or bromo.

4. The method according to claim 1, wherein X is N; Y is CH; and $R^2$ is difluoromethyl.

5. The method according to claim 4, wherein $R^1$ is methyl.

6. The method according to claim 1, wherein $R^3$ represents
—$CH_2$—$CH_2$—$C(CH_3)_2$—COOH;
—CO—$CH_2$—$C(CH_3)_2$—COOH; or
—$SO_2$—$NH_2$.

7. The method according to claim 3, wherein $R^3$ represents-$SO_2$—$NH_2$.

8. The method according to claim 1, wherein the compound is
4-(3-((2-(difluoromethoxy)-6-methylpyridin-3-yl) carbamoyl)-3-(2-isopropylphenyl) azetidin-1-yl)-2,2-dimethylbutanoic acid;
5-(3-((2-(difluoromethoxy)-6-methylpyridin-3-yl) carbamoyl)-3-(2-isopropylphenyl) azetidin-1-yl)-2,2-dimethylpentanoic acid;
4-(3-((2-(difluoromethoxy)-6-methylpyridin-3-yl) carbamoyl)-3-(2-isopropylphenyl) azetidin-1-yl)-2,2-dimethyl-4-oxobutanoic acid;
5-(3-((2-(difluoromethoxy)-6-methylpyridin-3-yl) carbamoyl)-3-(2-isopropylphenyl) azetidin-1-yl)-2,2-dimethyl-5-oxopentanoic acid;
N-(2-(difluoromethoxy)-6-methylpyridin-3-yl)-3-(2-isopropylphenyl)-1-sulfamoylazetidine-3-carboxamide;
3-(2-isopropylphenyl)-N-(2-methoxy-6-methylpyridin-3-yl)-1-sulfamoylazetidine-3-carboxamide;
N-(2-ethoxy-6-methylpyridin-3-yl)-3-(2-isopropylphenyl)-1-sulfamoylazetidine-3-carboxamide;
N-(2-isopropoxy-6-methylpyridin-3-yl)-3-(2-isopropylphenyl)-1-sulfamoylazetidine-3-carboxamide;
4-(3-((6-chloro-4-methoxypyridin-3-yl) carbamoyl)-3-(2-isopropylphenyl) azetidin-1-yl)-2,2-dimethylbutanoic acid;
4-(3-((6-chloro-4-ethoxypyridin-3-yl) carbamoyl)-3-(2-isopropylphenyl) azetidin-1-yl)-2,2-dimethylbutanoic acid;
4-(3-((6-chloro-4-isopropoxypyridin-3-yl) carbamoyl)-3-(2-isopropylphenyl) azetidin-1-yl)-2,2-dimethylbutanoic acid;
4-(3-((6-bromo-4-methoxypyridin-3-yl) carbamoyl)-3-(2-isopropylphenyl) azetidin-1-yl)-2,2-dimethylbutanoic acid;
5-(3-((6-chloro-4-methoxypyridin-3-yl) carbamoyl)-3-(2-isopropylphenyl) azetidin-1-yl)-2,2-dimethylpentanoic acid;
5-(3-((6-chloro-4-ethoxypyridin-3-yl) carbamoyl)-3-(2-isopropylphenyl) azetidin-1-yl)-2,2-dimethylpentanoic acid;
4-(3-((6-chloro-4-methoxypyridin-3-yl) carbamoyl)-3-(2-isopropylphenyl) azetidin-1-yl)-2,2-dimethyl-4-oxobutanoic acid;
4-(3-((6-bromo-4-methoxypyridin-3-yl) carbamoyl)-3-(2-isopropylphenyl) azetidin-1-yl)-2,2-dimethyl-4-oxobutanoic acid;
4-(3-((6-chloro-4-ethoxypyridin-3-yl) carbamoyl)-3-(2-isopropylphenyl) azetidin-1-yl)-2,2-dimethyl-4-oxobutanoic acid;
N-(6-fluoro-4-methoxypyridin-3-yl)-3-(2-isopropylphenyl)-1-sulfamoylazetidine-3-carboxamide;
N-(6-chloro-4-methoxypyridin-3-yl)-3-(2-isopropylphenyl)-1-sulfamoylazetidine-3-carboxamide;
N-(6-chloro-4-ethoxypyridin-3-yl)-3-(2-isopropylphenyl)-1-sulfamoylazetidine-3-carboxamide;
N-(6-chloro-4-isopropoxypyridin-3-yl)-3-(2-isopropylphenyl)-1-sulfamoylazetidine-3-carboxamide;
N-(6-bromo-4-methoxypyridin-3-yl)-3-(2-isopropylphenyl)-1-sulfamoylazetidine-3-carboxamide; or
3-(2-isopropylphenyl)-N-(4-methoxy-6-methylpyridin-3-yl)-1-sulfamoylazetidine-3-carboxamide;
or a pharmaceutically acceptable salt thereof.

9. The method according to claim 1, wherein the compound is
4-(3-((2-(difluoromethoxy)-6-methylpyridin-3-yl) carbamoyl)-3-(2-isopropylphenyl) azetidin-1-yl)-2,2-dimethylbutanoic acid;
4-(3-((2-(difluoromethoxy)-6-methylpyridin-3-yl) carbamoyl)-3-(2-isopropylphenyl) azetidin-1-yl)-2,2-dimethyl-4-oxobutanoic acid; or
N-(6-chloro-4-methoxypyridin-3-yl)-3-(2-isopropylphenyl)-1-sulfamoylazetidine-3-carboxamide;
or a pharmaceutically acceptable salt thereof.

10. The method according to claim 1, wherein said compound of formula (I), or pharmaceutically acceptable salt thereof, is administered in combination with pirfenidone, or a pharmaceutically acceptable salt thereof.

11. The method according to claim 10, wherein pirfenidone, or a pharmaceutically acceptable salt thereof, is administered in a pharmaceutical unit dosage form suitable for the oral administration of a total of about 2403 mg per day or below.

12. The method according to claim 1; wherein said fibrotic disease is:
pulmonary fibrosis;
renal fibrosis; or
liver fibrosis.

13. The method according to claim 1; wherein said fibrotic disease is:
idiopathic pulmonary fibrosis;
pulmonary fibrosis secondary to systemic inflammatory disease;
pulmonary fibrosis secondary to sarcoidosis;
radiation-induced fibrosis;
silicosis-induced pulmonary fibrosis; or
asbestos-induced pulmonary fibrosis.

14. A pharmaceutical composition comprising, as active principles, a compound of formula (I):

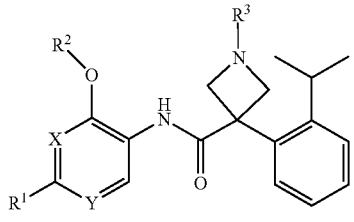

Formula (I)

wherein
- X is CH; Y is N; and $R^2$ is methyl, ethyl, or isopropyl; or
- X is N; Y is CH; and $R^2$ is methyl, ethyl, or isopropyl, or difluoromethyl;

$R^1$ is fluoro, chloro, bromo, or methyl; and $R^3$ represents
—$(CH_2)_{2-3}$—$C(CH_3)_2$—COOH;
—CO—$(CH_2)_{1-2}$—$C(CH_3)_2$—COOH; or
—$SO_2$—$NH_2$;

or a pharmaceutically acceptable salt thereof; in combination with one or more therapeutically active ingredients acting as anti-fibrotic agent(s); wherein said anti-fibrotic agent(s) is/are pirfenidone and/or nintedanib; or a pharmaceutically acceptable salt thereof; as well as at least one pharmaceutically acceptable excipient.

15. The method according to claim 1, wherein said fibrotic disease is:
   pulmonary fibrosis; wherein said pulmonary fibrosis is selected from idiopathic pulmonary fibrosis; pulmonary fibrosis secondary to systemic inflammatory disease; pulmonary fibrosis secondary to sarcoidosis; iatrogenic pulmonary fibrosis; silicosis-induced pulmonary fibrosis; asbestos-induced pulmonary fibrosis; and pleural fibrosis;
   renal fibrosis; wherein said renal fibrosis is selected from renal fibrosis associated with CKD, chronic renal failure, tubulointerstitial nephritis, and a chronic nephropathy selected from primary glomerulonephritis and glomerulonephritis secondary to a systemic inflammatory disease, diabetes, focal segmental glomerular sclerosis, IgA nephropathy, hypertension, renal allograft, or Alport syndrome; or
   liver fibrosis; wherein said liver fibrosis is selected from cirrhosis, alcohol-induced liver fibrosis, nonalcoholic steatohepatitis, biliary duct injury, primary biliary cirrhosis, infection-induced liver fibrosis, viral-induced liver fibrosis, and autoimmune hepatitis.

16. The method according to claim 1, wherein said compound of formula (I), or pharmaceutically acceptable salt thereof, is administered in combination with nintedanib, or a pharmaceutically acceptable salt thereof.

17. The method according to claim 1, wherein said compound of formula (I), or pharmaceutically acceptable salt thereof, is administered in combination with both pirfenidone, or a pharmaceutically acceptable salt thereof, and nintedanib, or a pharmaceutically acceptable salt thereof.

18. The method according to claim 9, wherein the compound, or pharmaceutically acceptable salt thereof, is administered in combination with pirfenidone, or a pharmaceutically acceptable salt thereof.

19. The method according to claim 1, wherein the compound is
   4-(3-((2-(difluoromethoxy)-6-methylpyridin-3-yl) carbamoyl)-3-(2-isopropylphenyl) azetidin-1-yl)-2,2-dimethylbutanoic acid;
   or a pharmaceutically acceptable salt thereof.

20. The method according to claim 1, wherein the compound is
   4-(3-((2-(difluoromethoxy)-6-methylpyridin-3-yl) carbamoyl)-3-(2-isopropylphenyl) azetidin-1-yl)-2,2-dimethyl-4-oxobutanoic acid;
   or a pharmaceutically acceptable salt thereof.

21. The method according to claim 1, wherein the compound is
   N-(6-chloro-4-methoxypyridin-3-yl)-3-(2-isopropylphenyl)-1-sulfamoylazetidine-3-carboxamide;
   or a pharmaceutically acceptable salt thereof.

22. The method according to claim 21; wherein said fibrotic disease is:
   pulmonary fibrosis;
   renal fibrosis; or
   liver fibrosis.

23. The method according to claim 21; wherein said fibrotic disease is pulmonary fibrosis.

24. The method according to claim 21; wherein said fibrotic disease is:
   idiopathic pulmonary fibrosis;
   pulmonary fibrosis secondary to systemic inflammatory disease;
   pulmonary fibrosis secondary to sarcoidosis;
   radiation-induced fibrosis;
   silicosis-induced pulmonary fibrosis; or
   asbestos-induced pulmonary fibrosis.

25. The method according to claim 23, wherein the compound, or pharmaceutically acceptable salt thereof, is administered in combination with pirfenidone, or a pharmaceutically acceptable salt thereof.

26. The method according to claim 24, wherein the compound, or pharmaceutically acceptable salt thereof, is administered in combination with pirfenidone, or a pharmaceutically acceptable salt thereof.

27. A method for treatment of pulmonary fibrosis in a subject in need thereof, wherein the method comprises administering to the subject N-(6-chloro-4-methoxypyridin-3-yl)-3-(2-isopropylphenyl)-1-sulfamoylazetidine-3-carboxamide, or a pharmaceutically acceptable salt thereof, in combination with pirfenidone, or a pharmaceutically acceptable salt thereof.

* * * * *